(12) United States Patent
Tomita

(10) Patent No.: US 7,146,526 B2
(45) Date of Patent: Dec. 5, 2006

(54) DATA I/O SYSTEM USING A PLURALITY OF MIRROR VOLUMES

(75) Inventor: Aki Tomita, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 10/797,650

(22) Filed: Mar. 9, 2004

(65) Prior Publication Data

US 2005/0076263 A1 Apr. 7, 2005

(30) Foreign Application Priority Data

Oct. 1, 2003 (JP) .............................. 2003-343478

(51) Int. Cl.
G06F 12/16 (2006.01)
(52) U.S. Cl. ............................. 714/6; 711/114; 711/161
(58) Field of Classification Search ................ 711/161, 711/162; 707/204; 709/217
See application file for complete search history.

(56) References Cited

U.S. PATENT DOCUMENTS

| | | | |
|---|---|---|---|
| 5,889,935 A * | 3/1999 | Ofek et al. ...................... 714/6 |
| 6,044,444 A * | 3/2000 | Ofek ........................... 711/162 |
| 6,101,497 A | 8/2000 | Ofek |
| 6,173,377 B1 * | 1/2001 | Yanai et al. .................. 711/162 |
| 6,199,074 B1 * | 3/2001 | Kern et al. .................. 707/204 |
| 6,363,462 B1 | 3/2002 | Bergsten |
| 6,820,180 B1 * | 11/2004 | McBrearty et al. .......... 711/162 |
| 2002/0046330 A1 * | 4/2002 | Suzuki et al. ................ 711/162 |
| 2002/0059505 A1 * | 5/2002 | St. Pierre et al. ........... 711/162 |
| 2002/0129047 A1 * | 9/2002 | Cane et al. .................. 707/204 |
| 2002/0144068 A1 * | 10/2002 | Ohran ......................... 711/161 |
| 2002/0181415 A1 * | 12/2002 | West et al. .................. 370/312 |
| 2003/0051111 A1 * | 3/2003 | Nakano et al. .............. 711/162 |
| 2003/0097524 A1 * | 5/2003 | Brant et al. ................. 711/114 |
| 2003/0097619 A1 | 5/2003 | Parry |
| 2003/0126327 A1 * | 7/2003 | Pesola et al. .................. 710/74 |
| 2003/0126388 A1 | 7/2003 | Yamagami |
| 2003/0131068 A1 * | 7/2003 | Hoshino et al. ............ 709/216 |
| 2003/0182348 A1 * | 9/2003 | Leong et al. ................ 709/100 |
| 2003/0182503 A1 * | 9/2003 | Leong et al. ................ 711/114 |
| 2003/0225966 A1 * | 12/2003 | Frandsen ..................... 711/111 |
| 2004/0030852 A1 * | 2/2004 | Coombs et al. ............. 711/162 |
| 2004/0098547 A1 * | 5/2004 | Ofek et al. .................. 711/162 |
| 2004/0128442 A1 * | 7/2004 | Hinshaw et al. ............ 711/114 |
| 2004/0168034 A1 * | 8/2004 | Homma et al. ............. 711/162 |
| 2004/0230859 A1 * | 11/2004 | Cochran et al. ............... 714/2 |
| 2005/0021573 A1 * | 1/2005 | McDermott et al. ........ 707/204 |

(Continued)

Primary Examiner—Reginald Bragdon
Assistant Examiner—Thanh D. Vo
(74) Attorney, Agent, or Firm—Townsend and Townsend and Crew LLP

(57) ABSTRACT

A data I/O system comprises a plurality of storage devices and a controller which controls the storage devices. In the data I/O system, the controller further includes a read/write unit, responsive to the subsequent receipt of a read request and a write request, for reading data stored in the storage devices and writing data in the storage devices, a logical volume management unit for mapping between a logical image of the data storage of a host processor (logical volume) and an actual space in the storage devices, a volume management unit for managing an active primary production volume (P-VOL) and second multiple mirror volumes (S-VOL) created as mirror images of the primary volume, and an S-VOL restoring unit for restoring the data of a first S-VOL with the data of a second S-VOL depending on the type of an error that happens in the first S-VOL.

18 Claims, 21 Drawing Sheets

U.S. PATENT DOCUMENTS

| | | | |
|---|---|---|---|
| 2005/0034013 A1* | 2/2005 | Yamamoto et al. | 714/6 |
| 2005/0071586 A1* | 3/2005 | Bartfai et al. | 711/162 |
| 2005/0071708 A1* | 3/2005 | Bartfai et al. | 714/5 |
| 2005/0071710 A1* | 3/2005 | Micka et al. | 714/6 |
| 2005/0108302 A1* | 5/2005 | Rand et al. | 707/204 |
| 2005/0154846 A1* | 7/2005 | Chen et al. | 711/162 |

* cited by examiner

COPY SOURCE-DESTINATION TABLE 700

| COPY SOURCE LU (LUN) | COPY DESTINATION LU (LUN) |
|---|---|
| 1 | 10 |
| 2 | 11 |
| 3 | 12 |
| 4 | 13 |
| 5 | 14 |

FIG. 7

S-VOL GROUP OPERATION COMMAND (MANAGEMENT SERVER/MA)

| COMMAND ID | COMMAND SPECIFIC FIELD |
|---|---|
| 820 | 830 |

0 : S-VOL GROUP INITIALIZATION
1 : RESTORE
3 : QUERY (S-VOL ATTRIBUTE/SPARE S-VOL ATTRIBUTE)

S-VOL GROUP INITIALIZATION COMMAND 810-1

| 0 | GROUP ID | S-VOL ATTRIBUTE LIST | NUMBER OF SPARES |
|---|---|---|---|
| 820 | 831 | 832 | 833 |

830

S-VOL ATTRIBUTE LIST 832

| LID | ATTRIBUTE (RO/RW) |
|---|---|
| 834 | 835 |

RESTORE COMMAND 810-2

| 1 | LID | BIDs |
|---|---|---|
| 820 | 836 | 837 |

830

S-VOL GROUP MANAGEMENT TABLE 900

| GROUP ID (GrpID) 901 | LOGICAL VOLUME ID (LID) 902 | LOGICAL REGION ATTRIBUTE (Attr) 903 | PHYSICAL VOLUME ID (PID) 904 | RECOVERY ID (RLID) 905 |
|---|---|---|---|---|
| G0 | LV0 | RO | PD0 | |
| | LV1 | RO | PD1 | |
| | LV2 | RW | PD2 | DLV2 |
| | S0 | RO | PD3 | |
| | DLV2 | RW | PD4 | |

FIG. 9

0: S-VOL INITIALIZATION
1: PID CHANGE
2: QUERY (ATTRIBUTE/PID/ACCESS FREQUENCY)
3: RESTORE

S-VOL MANAGEMENT TABLE 1200

| LOGICAL VOLUME ID (LID) | LOGICAL VOLUME ATTRIBUTE (Attr) | PHYSICAL VOLUME ID (PID) | RECOVERY LID (RLID) | ACCESS FREQUENCY (Freq) |
|---|---|---|---|---|
| LV0 | RO | PD0 | | |
| LV1 | RO | PD1 | | |
| LV2 | RW | PD2 | DLV2 | |
| S0 | — | PD3 | | |
| DLV2 | RW | PD4 | | |

FIG. 12

INCREMENTS MANAGEMENT TABLE 1300

| INCREMENTS LID (DLID) | BLOCK ID (BID) |
|---|---|
| DLV2 | |

FIG. 13

DATA I/O SYSTEM USING A PLURALITY OF MIRROR VOLUMES

CROSS-REFERENCE TO RELATED APPLICATIONS

The present application claims priority upon Japanese Patent Application No. 2003-343478 filed on Oct. 1, 2003, which is herein incorporated by reference.

BACKGROUND OF THE INVENTION

1. Field of the Invention

The present invention relates to a data I/O system and a method of controlling the data I/O system, and specifically relates to a technology to ensure availability of a secondary mirror volume in which a copy of data of a primary volume is written.

2. Description of the Related Art

Recently, storage systems that manage rapidly increasing data assets have played a vital role in an enterprise information infrastructure. In an increasing social demand for the storage like this, the storage system requires very high availability such that 24-hour-a-day, 365-day-a-year nonstop safety operations are possible. Therefore, the recent storage systems have adopted various technologies to improve the availability of the main transaction processing, such as a mechanism to backup data and a mechanism (replication) to copy data for data analysis or development/testing with no impact on main transaction processing (for example, see U.S. Pat. No. 6,101,497). In the above replication, data stored in a volume (primary volume) applied to main transaction processing is copied to another volume (secondary mirror volume), and this secondary mirror volume is used in various secondary transaction processing such as data backup, data analysis, and development/testing. Thus, it is possible to minimize the influence of the secondary transaction processing on the main transaction processing, which also improves the availability of the main transaction processing.

The aforementioned replication technology can basically improve the availability of the primary volume used in the main transaction processing but does not take into consideration availability of the secondary mirror volume. However, actual transaction processing often requires the availability of the secondary mirror volume used in the secondary transaction processing. For example, a content of the secondary mirror volume is sometimes corrupted by a bug inherent in a program, a hardware error, and the like in the transaction processing such as data analysis and development/testing. In such a case, a mechanism is required to simply and quickly recover the secondary mirror volume. In recovery of the secondary mirror volume, the content of the secondary mirror volume is not always restored to an expected content even if data of the primary volume is copied to the secondary mirror volume. The content of the primary volume at the time of copying could have been already updated, and the content after restored does not always agree with the content of the secondary mirror volume before corrupted.

SUMMARY OF THE INVENTION

The present invention provides a data I/O system which can ensure the availability of a secondary mirror volume in which a copy for data of a primary volume is written and provides a method of controlling the data I/O system.

An embodiment of the present invention is a data I/O system including: a plurality of storage devices; and a controller which controls the storage devices. In the data I/O system, the controller further includes: read/write unit, responsive to the subsequent receipt of a read request and a write request, for reading data stored in the storage devices and writing data in the storage devices; logical volume management unit for mapping between a logical image of the data storage of a host processor (logical volume) and an actual space in the storage devices; volume management unit for managing an active primary production volume (P-VOL) and second multiple mirror volumes (S-VOL) created as mirror images of the primary volume; and S-VOL restoring unit for restoring the data of a first S-VOL with the data of a second S-VOL depending on the type of an error that happens in the first S-VOL.

The storage devices are, for example, disk drives (hard disk devices). The data I/O system is, for example, a disk array system which accepts access requests sent from the data processing system, and writes data in the disk drives and reads data stored in the disk drives according to the access requests. The I/O data system of the present invention restores the data of a first S-VOL with the data of a second S-VOL depending on the type of an error that happens in the first S-VOL.

The recovery of S-VOLs are not always performed by a unique method, but performed according to an error type. Therefore, it is possible to efficiently recover S-VOLs by a flexible method. Examples of the error type are data errors, that is, a case where data is corrupted in terms of software and hardware errors caused by hardware failures of disk drives. There are various restoration methods according to the attribute (read-only (RO), read-and-writable (RW), etc.) of an S-VOL where an error has happened, including: a method of copying data of a RO S-VOL to the S-VOL where an error has happened; a method of replacing the S-VOL where an error has happened with a RO S-VOL; and a method of recovering a read-and-writable S-VOL by storing updates that have occurred in the RW S-VOL since a P-VOL and the RW S-VOL were separated in an increments-volume and replacing it with the RO S-VOL that has updated by data of the increments-volume.

Furthermore, in the case of drive errors, a storage device where an error has happened is replaced, and the S-VOL is formed with another storage device normally operating. This enables the S-VOL to be recovered without changing the identification (for example, logical volume ID (LID)) thereof.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawing wherein:

FIG. 7 is a view showing an example of a copy source-destination management table 700;

FIG. 9 is a view showing an example of an S-VOL group management table 900;

FIG. 12 is a view showing an S-VOL management table 1200;

FIG. 13 is a view showing an increments management table 1300;

DETAILED DESCRIPTION OF THE INVENTION

At least the following matters will be made clear by the explanation in the present specification and the description of the accompanying drawings.

Hardware Configuration

Figure 1:
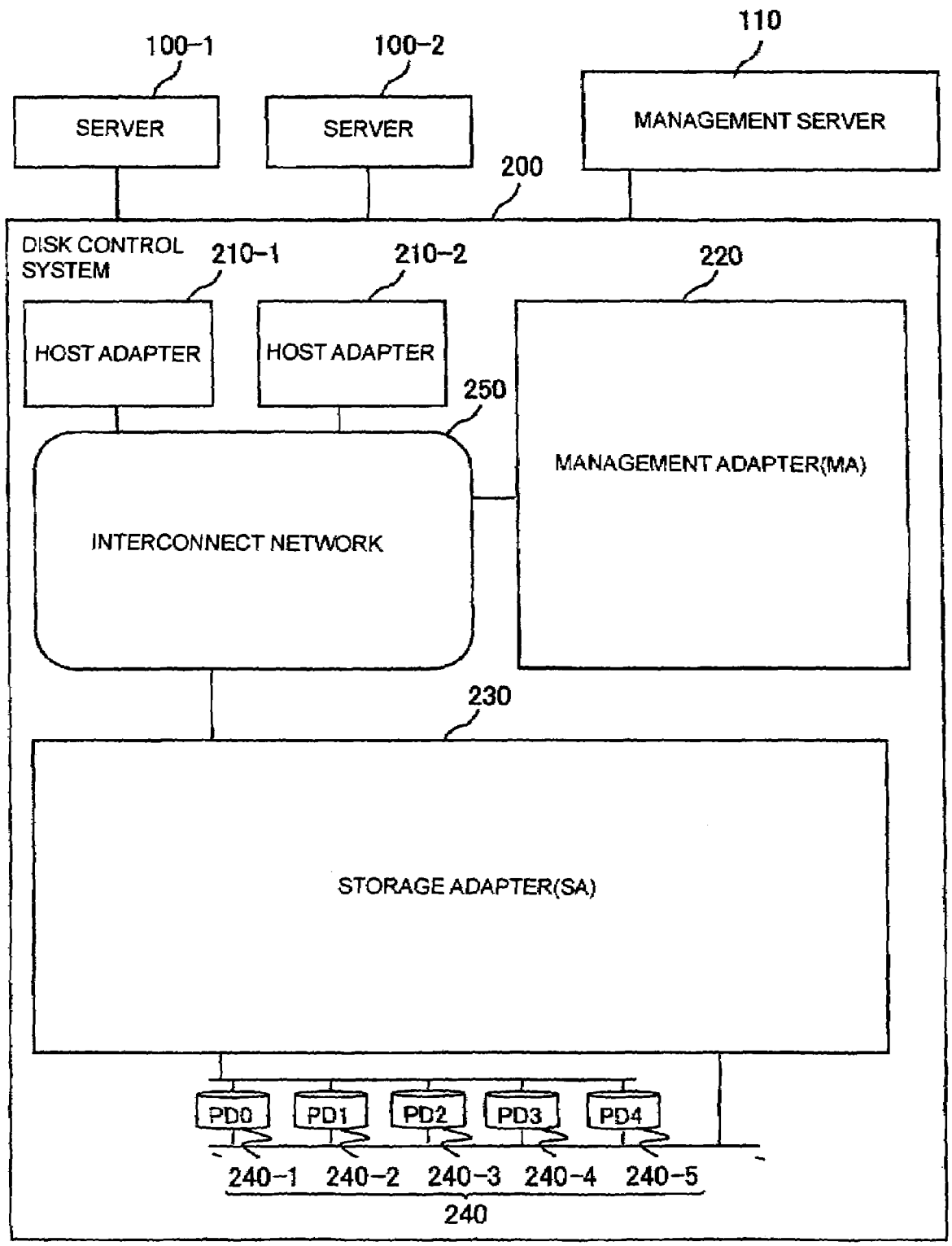
FIG. 1 is a schematic view showing an example of the hardware configuration of a storage system.

FIG. 1 shows an example of the hardware configuration of a storage system to be described as an embodiment. The storage system includes servers 100 (100-1, 100-2) as data processing systems, a disk control system 200 as a data I/O system, and a management server 110, which are connected so as to communicate with each other. For example, Ethernet (trade mark) is used as a physical protocol of the communication.

The disk control system 200 is connected to the servers 100 (100-1, 100-2) and receives data read/write requests issued from the servers 100 (100-1, 100-2). The data read/write requests are also referred to as data input/output requests. The disk control system 200 includes a number of disk drives 240 (240-1 to 240-5) as storage devices. The disk control system 200 reads data stored in the disk drives 240 (240-1 to 240-5) and writes data in the disk drives 240 (240-1 to 240-5) according to the data input/output requests (access requests) issued from the servers 100 (100-1, 100-2).

The disk drives 240 (240-1 to 240-5) supply physical storage regions (hereinafter, referred to as physical volumes) provided for the servers 100 (100-1, 100-2). The disk control system 200 manages the storage regions in terms of a logical volume as a unit (hereinafter, also referred to as LU (logical unit)) which is a logical storage region composed of a physical volume. For example, the servers 100 (100-1, 100-2) can identify a storage region on the disk drives 240 (240-1 to 240-5) to which data is written or from which data is read by specifying a logical volume. Note that the disk drives 240 (240-1 to 240-5) may be integrated with the disk control system 200 as shown in FIG. 1 (for example, accommodated in a same enclosure as that accommodating the disk control system 200), or may be separated from the disk control system 200 (for example, accommodated in a different enclosure from that accommodating the disk control system 200).

The servers 100 (100-1, 100-2) are computers each including a CPU (Central Processing Unit), a memory, and an I/O device. The servers 100 (100-1, 100-2) provide various services for other computers that access the servers 100. Examples of the services are on-line services such as bank's automated teller services and Internet homepage browsing services, batch services executing experimental simulation in a science and technology field, and the like.

Communication between the servers 100 (100-1, 100-2) and the disk control system 200 can be performed according to various protocols. Examples thereof are Fibre Channel, SCSI (Small Computer System Interface), FICON (Fibre Connection) (trade mark), ESCON (Enterprise System Connection) (trade mark), ACONARC (Advanced Connection Architecture) (trade mark), FIBARC (Fibre Connection Architecture) (trade mark), TCP/IP (Transmission Control Protocol/Internet Protocol), and the like. In this communication, several communication protocols can be used among these protocols. For example, when the servers 100 (100-1, 100-2) are mainframes, FICON, ESCON, ACONARC, and FIBER are used. When the servers 100 (100-1, 100-2) are open servers, for example, Fibre Channel, SCSI, and TCP/IP are used.

The servers 100 (100-1, 100-2) may request data to be read or written in blocks, each block being a data access/storage unit in the logical volumes, or in files by specifying a file name. In other words, the disk control system 200 may offer a fixed-size block interface abstraction and can be made to serve as a NAS (Network Attached Storage) which provides a file interface.

The disk control system 200 includes the disk drives 240 (240-1 to 240-5) as magnetic disk devices, host adapters (HA) 210 (210-1, 210-2), a storage adapter (SA) 230, a management adapter (MA) 220, and an interconnect network 250, as components. The HAs 210 (210-1, 210-2) provide a function to communicate with the servers 100 (100-1, 100-2). The SA 230 provides a function to communicate with the disk drives 240 (240-1 to 240-5). Among these components, the HAs 210 (210-1, 210-2) are sometimes referred to as channel adapters, and the SA 230 is sometimes referred to as a disk adapter. The interconnect network 250 connects the HAs 210 (210-1, 210-2), the SA 230, and the MA 220 to each other such that these adapters can communicate with each other. The interconnect network 250 is composed of a high-speed crossbar switch, and the like. The interconnect network 250 is sometimes connected to a cache memory as a buffer transmitted between the HAs 210 (210-1, 210-2) and the SA 230. In some cases, the HAs 210 (210-1, 210-2), the SA 230, and the MA 220 are constructed as individual modular units so as to be attached to the enclosure of the disk control system 200, or two or more of these adapters are sometimes combined to be integrated as a single unit.

Next, a detailed description will be given of each component of the disk control system 200.

Figure 2:
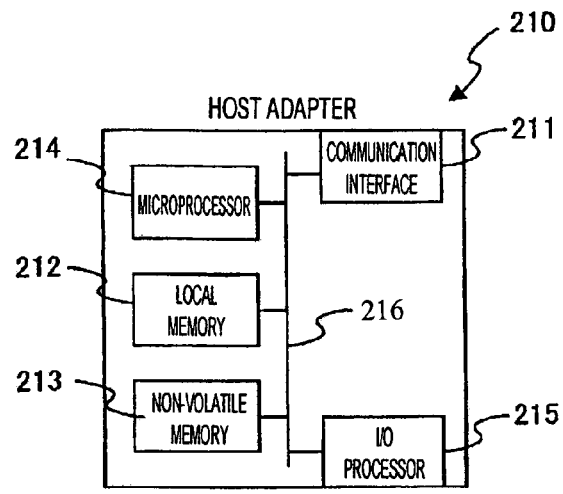
FIG. 2 is a block diagram showing an example of the hardware configuration of a host adapter (HA) 210.

FIG. 2 shows an example of the hardware configuration of the HAs 210 (210-1, 210-2). Each HA 210 (210-1, 210-2) includes a communication interface 211, a local memory 212, a non-volatile memory 213 composed of a flash memory or the like, a microprocessor 214, and an I/O processor 215. The communication interface 211 performs a process related to communication with the servers 100 (100-1, 100-2). The microprocessor 214 executes programs stored in the local memory 212 to perform various processes of this HA 210 (210-1, 210-2). The I/O processor 215 implements high-speed data transfer between the HA 210 (210-1, 210-2) and the SA 230 or the cache memory (not shown). These components are connected to each other through a bus 216. The non-volatile memory 213 stores microprograms which are software to implement the various processes that the HA 210 (210-1, 210-2) offers. The microprograms are properly loaded into the local memory 212 and executed by the microprocessor 214. For example, a DMA (Direct Memory Access) processor is used for the I/O processor 215.

Figure 3:
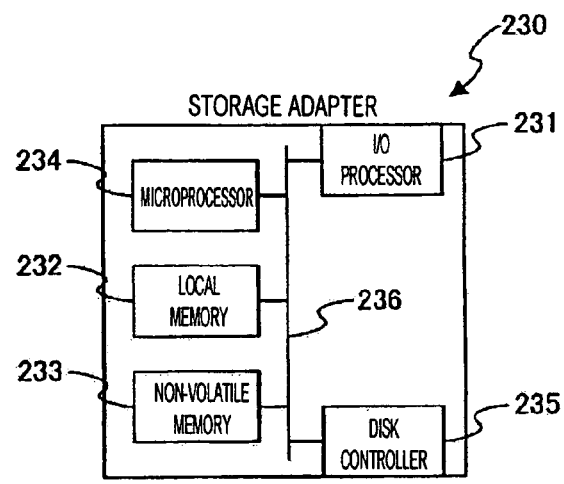
FIG. 3 is a block diagram showing an example of the hardware configuration of a storage adapter (SA) 230.

FIG. 3 shows an example of the configuration of the SA 230. The SA 230 includes an I/O processor 231, a local memory 232, a non-volatile memory 233 composed of a flash memory or the like, a microprocessor 234, and a disk controller 235. The I/O processor 231 implements data transfer between the SA 230 and the HAs 210 (210-1, 210-2). The microprocessor 234 executes programs stored in the local memory to perform various processes of the SA 230. The disk controller 235 writes data in the disk drives 240 (240-1 to 240-5) and reads data stored in the disk drives 240 (240-1 to 240-5). These components are connected to each other through a bus 236. The non-volatile memory 233 stores microprograms which are software to implement the various processes that the SA 230 offers. The microprograms are properly loaded into the local memory 232 and executed by the microprocessor 234. For example, a DMA processor is used for the I/O processor 231.

The SA 230 processes data read/write requests received by the HAs 210 (210-1, 210-2). The disk drives 240 (240-1 to 240-5) are connected to the SA 230. The SA 230 reads data stored in the disk drives 240 (240-1 to 240-5) and writes data in the disk drives 240 (240-1 to 240-5). The disk drives 240 (240-1 to 240-5) provide physical volumes (PD0 to PD4) constituting secondary mirror volumes (LV0 to LV2) to be described later. The disk controller 235 may control the disk drives 240 (240-1 to 240-5) with a RAID system (for example, RAID0, RAID1, or RAID5).

Figure 4:
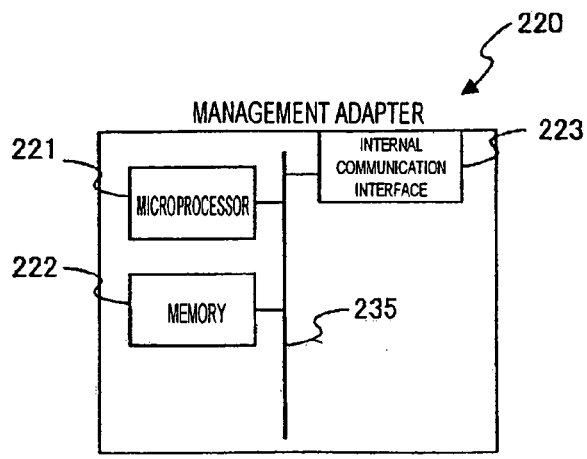
FIG. 4 is a block diagram showing an example of the hardware configuration of a management adapter (MA) 220.

FIG. 4 shows an example of the hardware configuration of the MA 220. The MA 220 includes a microprocessor 221 and a memory 222. The MA 220 is communicably connected to the HAs 210 (210-1, 201-2) and the SA 230 through the interconnect network 250 by an internal communication interface 223. The microprocessor 221 and the memory 222 are connected to each other through a bus 235. The MA 220 performs various settings for the HAS 210 (210-1, 210-2) and the SA 230, monitoring of various errors in the disk control system 200, and the like. The MA 220 can collect information on processing loads of each HA 210 (210-1, 210-2) and the SA 230. Examples of the information on the processing load are a utilization of the microprocessor 221, a frequency of accesses to each logical volume, and the like. These pieces of information are collected and managed based on a program executed in the HAs 210 (210-1, 210-2) and the SA 230. The MA 220 performs a process according to a setting command received by the HAs 210 (210-1, 210-2). Moreover, the MA 220 passes a notification command to be sent to the management server 110 to the HAs 210 (210-1, 210-2) through the interconnect network 250.

Figure 5:
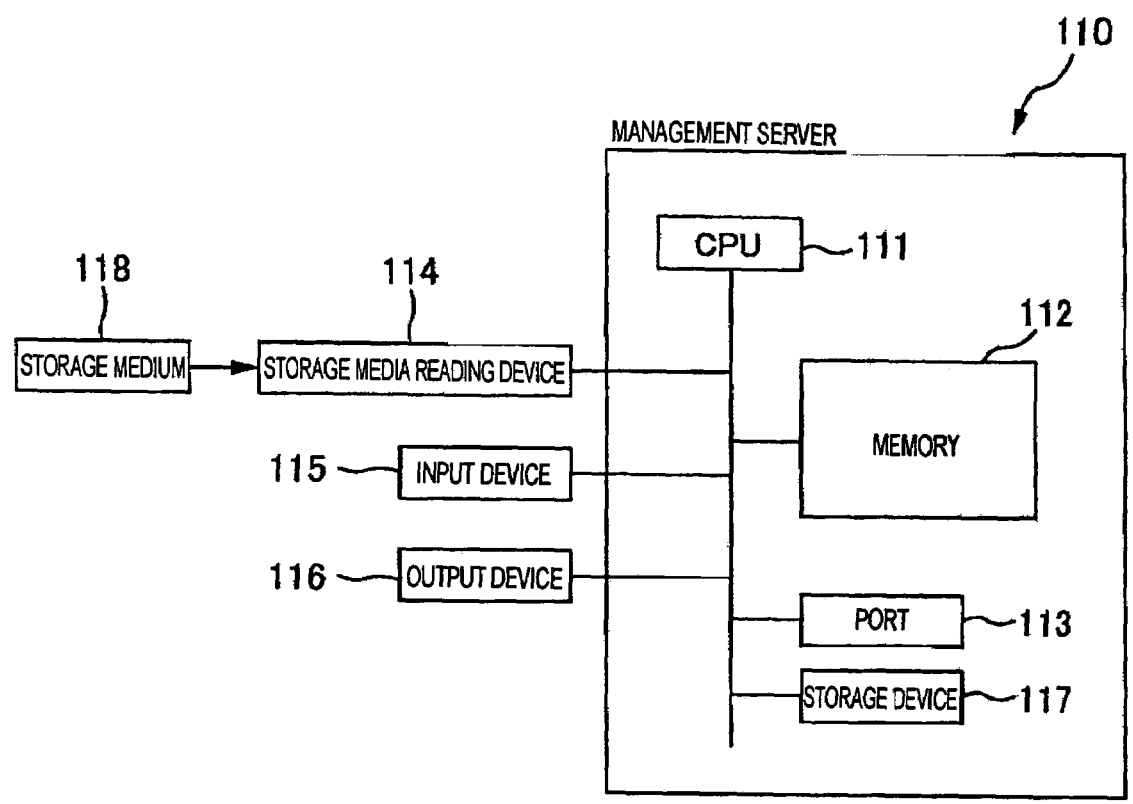
FIG. 5 is a block diagram showing an example of the hardware configuration of a management server 110.

FIG. 5 shows an example of the hardware configuration of the management server 110. The management server 110 includes a CPU 111, a memory 112, a port 113, a storage media reading device 114, an input device 115, an output device 116, and a storage device 117.

The CPU 111 controls the entire management server 110. The CPU 111 executes programs stored in the memory 112 to implement various processes offered by the management server 110. The storage media reading device 114 reads programs and data recorded in the storage medium 118. The read programs and data are stored in the memory 112 or the storage device 117. Accordingly, for example, a program recorded in the storage medium 118 can be read from the storage medium 118 using the storage media reading device 114 and stored in the memory 112 or the storage device 117. As the storage medium 118, a flexible disk, CD-ROM, DVD-ROM, DVD-RAM, a semiconductor memory, and the like can be used. The storage device 117 is, for example, a hard disk device, a flexible disk device, a semiconductor storage device, or the like. The input device 115 is used by an operator or the like for input of data to the management server 110 and the like. For example, a keyboard, a mouse, or the like is used as the input device 115. The output device 116 outputs information to the outside. For example, a display, printer, or the like is used as the output device 116. The port 113 is used for, for example, communication with the disk control system 200, and the management server 110 can communicate with the HAs 210 (210-1, 210-2), the SA 230, and the like through the port 113.

A manager of the storage system or the like can make, for example, various settings related to the disk drives 240 (240-1 to 240-5) by operating the management server 110. Examples of the various settings related to the disk drives 240 (240-1 to 240-5) are addition and removal of a disk drive, modification of the RAID structure (for example, change from RAID1 to RAID5), and the like.

With the management server 110, operations such as checking an operation state of the storage system and identifying an error unit can be performed. The management server 110 is connected to an external maintenance center by LAN, a telephone line, or the like. Using the management server 110, it is possible to monitor errors of the storage system and quickly deal with errors when happened. The occurrence of errors is notified by, for example, operating systems, applications, driver software, and the like which are running in the servers 100 (100-1, 100-2) and the management server 110. The notification is made through the HTTP protocol, the SNMP (Simple Network Management Protocol), E-mails, or the like. The various settings and controls for the management server 110 can be performed by use of Web pages provided by a Web server running in the management server 110.

Figure 6:
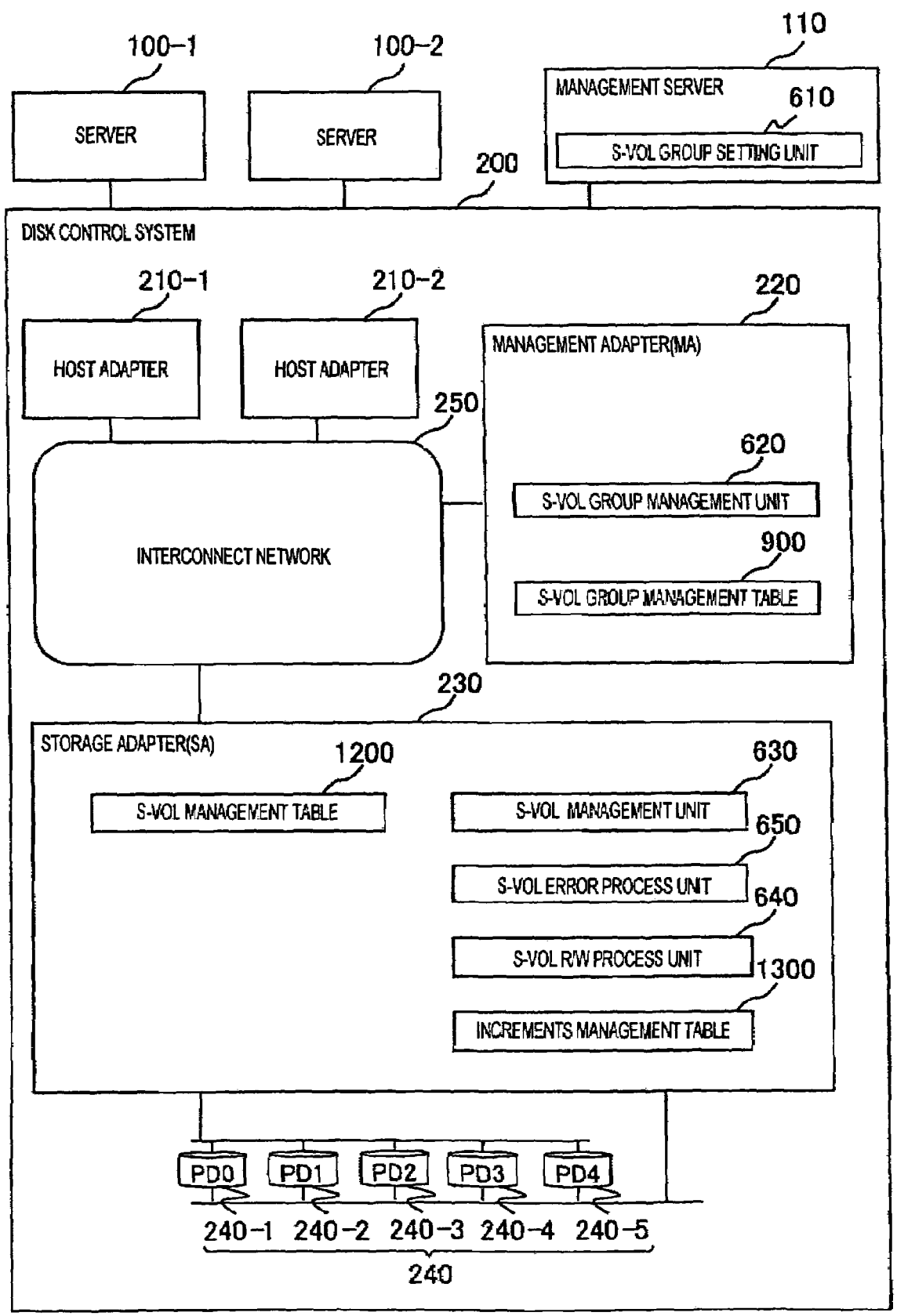
FIG. 6 is a block diagram showing an example of the main software configuration of the storage system.

Next, a description will be given of the software configuration of the storage system. FIG. 6 shows an example of software configuration of the storage system of this embodiment. Processes of each unit shown in this drawing is implemented by hardware corresponding to the unit or a program executed by the hardware. Moreover, various tables shown in FIG. 6 are stored and managed by the hardware corresponding to the unit or a program executed by the hardware.

Copy Management

First, a description will be given of a copy management process performed by the SA 230.

The copy management process is implemented by a program stored in the non-volatile memory 233 to implement the copy management process, the program being executed by the microprocessor 234 of the SA 230.

In the embodiment, an S-VOL management unit 630 shown in FIG. 6 provides the copy management process. The copy management indicates that, when data is written in a logical volume (hereinafter, referred to as a copy source logical volume), the same data is also written in another logical volume (hereinafter, referred to as a copy destination logical volume) different from the copy source logical volume to store a copy for data stored in a logical volume into another logical volume. In the operational mode of a general storage system, the copy source logical volume is set as a volume (primary volume) directly used in main transaction processing, and the copy destination logical volume is set as a volume (second mirror volume) to manage the copy for the primary volume. Note that this embodiment is assumed to also employ such settings. As previously described, the manager of the storage system or the like operates the management server 110 to set mapping between copy source logical volumes and copy destination logical volumes.

FIG. 7 shows an example of a copy source-destination management table 700 which manages the mapping between the copy source logical volumes and the copy destination logical volumes. In the copy source-destination management table 700, the logical volume IDs (LUNs (Logical Unit Numbers)) of the copy source logical volumes are made to correspond to the respective LUNs of the copy destination logical volumes.

In the copy management process, a control is performed such that, when data is written in the copy source logical volume, the data is also written in the copy destination logical volume. In the above control method, a synchronous mode and an asynchronous mode are available in some cases. In the synchronous mode, when data is written in the copy source logical volume, completion of writing is reported to the data processing system after the data is written in both the copy source and destination logical volumes. In other words, in the synchronous mode, the completion is not reported to the data processing system until the writing into both the copy source and destination logical volumes is completed. Accordingly, the synchronous mode ensures the identity between contents of the copy source and destination logical volumes with high reliability, but correspondingly reduces the speed of the response to the data processing system. On the other hand, in the asynchronous mode, when data is written in the copy source logical volume, completion of the writing is reported to the data processing system independently of whether the data has been written in the copy destination logical volume. Accordingly, in the asynchronous mode, the response to the data processing system is quick, but the identity between the copy source and destination logical volumes is not necessarily ensured.

In the copy management process, the relationship of a pair of the copy source logical volume and the copy destination logical volume is properly shifted between two states, a "paired state" and a "split state". The "paired state" is controlled so as to ensure the identity between data of the copy source and destination logical volumes in real time. Specifically, when data is written in the copy source logical volume, the same data is also written in the copy destination logical volume by the aforementioned synchronous or asynchronous mode. On the other hand, the "split state" is a state where the above control to ensure the identity in real time is released. Shift from the "paired state" to the "split state" is referred to as "split". On the contrary, shift from the "split state" to the "paired state" is referred to as "resync."

The shift from the "paired state" to the "split state" is, for example, performed for the purpose of the second transaction processing such as acquiring a backup of data of a primary volume; or using data of a main transaction processing for development or testing. For example, to acquire the backup of data, data in the copy destination logical volume is backed up to a storage medium such as a cartridge tape after the "paired state" is shifted to the "split state". For example, when data of the main transaction processing is desired to be used for development or testing, data in the copy destination logical volume is used for the development or testing after the "paired state" is shifted to the "split state". Since the secondary transaction processing such as backup is performed in a state shifted to the "split state" in such a manner, the influence on the main transaction processing due to the second transaction processing other than the main transaction processing can be suppressed as much as possible.

In the case where a pair in the "split state" is "resynced" into the "paired state" after the completion of secondary transaction processing and the like, it is required to reflect updates that have occurred in the copy source logical volume since the pair is "split" on the copy destination logical volume. The update increments during this period are stored in a logical volume, for example, in blocks, which is hereinafter referred to as an increments-volume. When a pair is "resynced", first, the content of the increments-volume is reflected on the copy destination logical volume, and then the pair is shifted to the "paired state".

S-VOL Group

Next, a description will be given of an S-VOL group. At least a secondary mirror volume (S-VOL) belongs to each S-VOL group. The S-VOL group properly contains a spare S-VOL and an increments-volume. The spare S-VOL stores data of the S-VOL after a time of aforementioned "split". In the spare S-VOL, the attribute is set to forbid data read/write accesses by the servers 100 (100-1, 100-2). The increments-volume stores increments data due to update performed in S-VOLs after a certain point of time.

Figure 8A:
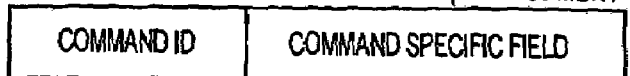
FIGS. 8A to 8C are views of data format examples of an S-VOL group operation command, an S-VOL group initialization command, and a restore command, respectively.

FIG. 8A shows the data format of an S-VOL group operation command to perform settings and operations related to an S-VOL group. The S-VOL group operation command is sent and received by the management server 110 and the SA 230, respectively. In FIG. 8A, a command ID which is an identification indicating a type of the command is set in a command ID field 820. In a command specific field 830, parameters and the like depending on the types of the command are set. The types of command are an S-VOL group initialization command to initialize an S-VOL; a restore command to restore data of an S-VOL where a data error has happened into the data content before the data error has happened; a query command to query the current attribute of the specified spare S-VOL or S-VOL; and the like. In the command ID field 820, a command ID (0: S-VOL initialization, 1: restore, 3: query (S-VOL attribute/spare S-VOL attribute)) corresponding to each command is set.

Figure 8B:
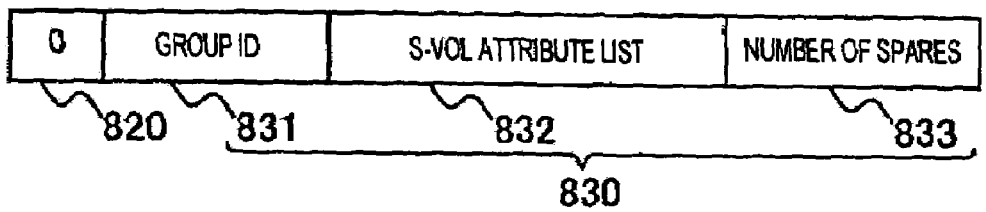
Figure 8B:
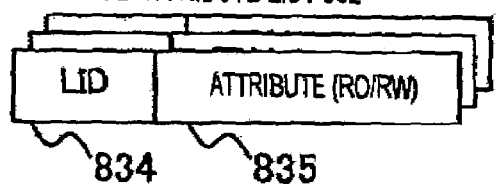

As an example, FIG. 8B shows the data format of the S-VOL group operation command in the case where the command is the S-VOL group initialization command. In FIG. 8B, a group ID which is an identification of an S-VOL group to be initialized is set in a group ID field 831. Each of S-VOL attribute lists 832 includes: a field 834 where an ID (LID) (hereinafter, referred to as S-VOL ID) of each S-VOL belonging to the S-VOL group to be initialized is set; and a field 835 where the attribute of each S-VOL is set. Types of the attribute are attributes "Read-Only (RO)" and "Read-Write (RW)". The "RO" restricts accesses to the S-VOL to only read accesses to data. The "RW" allows write accesses to data. When the S-VOL has an attribute of "Read-Only (RO)", "RO" is set in the field 834, and when the S-VOL has an attribute of "Read-Write (RW)", "RW" is set in the field 834. For example, the attribute of an S-VOL used for reference like in transaction processing such as backup, archive, and OLAP (Online Analytical Processing) is set to "RO". On the contrary, the attribute of an S-VOL used in a situation where data could be written, such as development and testing, is set to "RW". The S-VOL group initialization command includes the S-VOL attribute lists 832 as much as the number of S-VOLs belonging to the S-VOL group to be initialized. In FIG. 8B, the number of spare S-VOLs set for the S-VOL group of interest is set in a number of spare S-VOLs field 833.

Figure 8C:
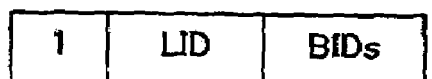

FIG. 8C shows the data format of the S-VOL group operation command in the case where the command is the restore command. The restore command 810-2 includes: a field 836 where an ID (referred to as an LID) of an S-VOL to be restored is set; and a field 837 where blocks (referred to as BIDs) to be restored are set.

VOL Group Initialization

Figure 10:
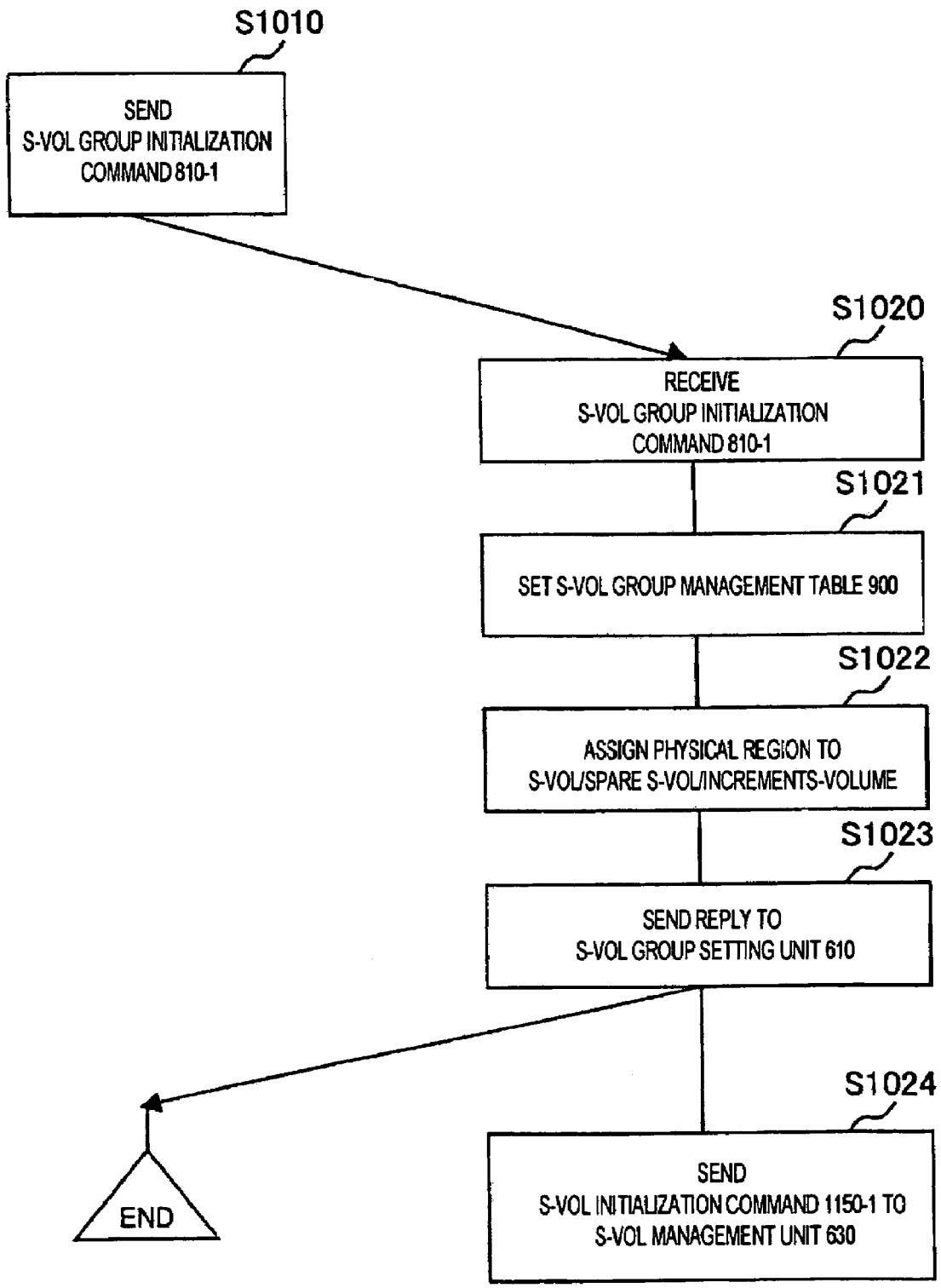
FIG. 10 is a flowchart illustrating an example of an S-VOL group initialization process.

Next, a description will be given of a process to initialize an S-VOL group, which is performed according to the aforementioned S-VOL group initialization command issued from the management server 110 to the SA 230. As an example, the following description will be given of a case where S-VOLs (LIDs=LI0 to LI2) having the same data content as that of the same primary volume are initialized as an S-VOL group with a group ID of GO. FIG. 9 shows an S-VOL group management table 900 managed in the MA 220. FIG. 10 shows a flowchart illustrating an S-VOL group initialization process.

In FIG. 10, first, an S-VOL group setting unit 610 of the management server 110 sends the S-VOL group initialization command 810-1 shown in FIG. 8B to an S-VOL group management unit 620 of the MA 220 (S1010). The S-VOL group management unit 620 receives the S-VOL group initialization command 810-1 (S1020).

The S-VOL group management unit 620 of the MA 220 sets the contents of the S-VOL group management table 900 based on the received S-VOL group initialization command 810-1 (S1021). Herein, when the S-VOL attribute lists 832 of the S-VOL group initialization command 810-1 include an S-VOL (RW S-VOL) with an attribute specified to "RW", the S-VOL group management unit 620 sets a logical volume (increments-volume) DLV2 to store update increments of the RW S-VOL. In the example of FIG. 9, the content of a cell in a logical region attribute column 903, which corresponds to the increments-volume (LID=DLV2) at the bottom cell in a logical volume ID column 902, is set to "RW". In the S-VOL group management table 900, an ID of a logical volume used for recovery of the S-VOL is set in a corresponding cell in a recovery logical volume ID (recovery LID) column 905. For example, the recovery LID of an S-VOL with an attribute of "RW" is set to the ID of an increments-volume used for recovery of that S-VOL.

The S-VOL group management unit 620 sets spare S-VOLs as much as the value set in the number-of-spare S-VOLs field 833 of the S-VOL group initialization command 810-1 shown in FIG. 8B for the S-VOL group GO. The contents of the S-VOL management table 900 are set in such a manner.

The S-VOL group management unit 620 then assigns physical volume regions (PD0 to PD4) to the respective volumes of S-VOLs (LIDs=LV0 to LV2), an increments-volume (LID=DVL2), and a spare S-VOL (LID=S0) based on the above S-VOL group management table 900 whose contents have been set (S1022).

Subsequently, the S-VOL group management unit 620 sends a reply for the S-VOL group initialization command 810-1 to the S-VOL group setting unit 610 (S1023) and sends an S-VOL initialization command 1150-1 to an S-VOL management unit 630 of the SA 230 (S1024), which processes read/write accesses to logical volumes.

Figure 11A:
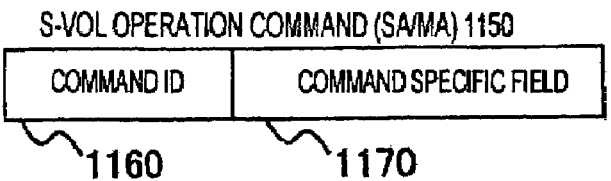
FIGS. 11A to 11C are views of data format examples of an S-VOL operation command, an S-VOL initialization command 1150-1, and a restore command 1150-2, respectively.

FIG. 11A shows a data format of the S-VOL operation command. A command ID (0: S-VOL initialization, 1: PID change, 2: query (attribute/PID/access frequency), 3: restore) indicating a type of command is set in the S-VOL operation command. The command with "0: S-VOL initialization" is a command to initialize an S-VOL. The command with "1: PID change" is a command to change a physical volume of a specified S-VOL. The command with "2: query (attribute/PID/access frequency)" is a command to query the attribute, the physical volume ID, and the access frequency of a specified S-VOL or spare S-VOL. The command with "3: restore" is a command to restore data of specified blocks (BIDS) of a specified S-VOL (LID) with reference to a specified RLID. A command specific field with contents depending on the types of command is set in a field 1170.

Figure 11B:
Figure 11B:
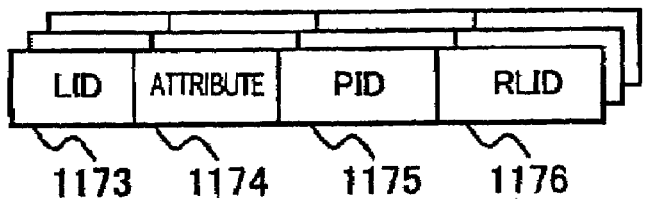

FIG. 11B shows the data format of the S-VOL initialization command. The S-VOL initialization command 1150-1 includes: a field 1171 where the command ID is set; and a field 1172 where volume lists are set. Each volume list is a combination of the (logical) volume ID, the attribute, and the physical volume ID of each of S-VOLs, a spare S-VOL, and an increments-volume.

Figure 11C:
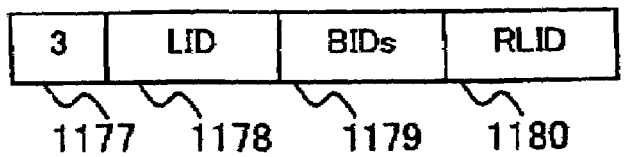

FIG. 11C shows the data format of the restore command 1150-2. The restore command 1150-2 includes: a field 1178 where an S-VOL ID is set; a field 1179 where blocks to be restored are set; and a field 1180 in which a recovery LID referred to for restoring (recovering) is set.

S-VOL Initialization

Figure 14:
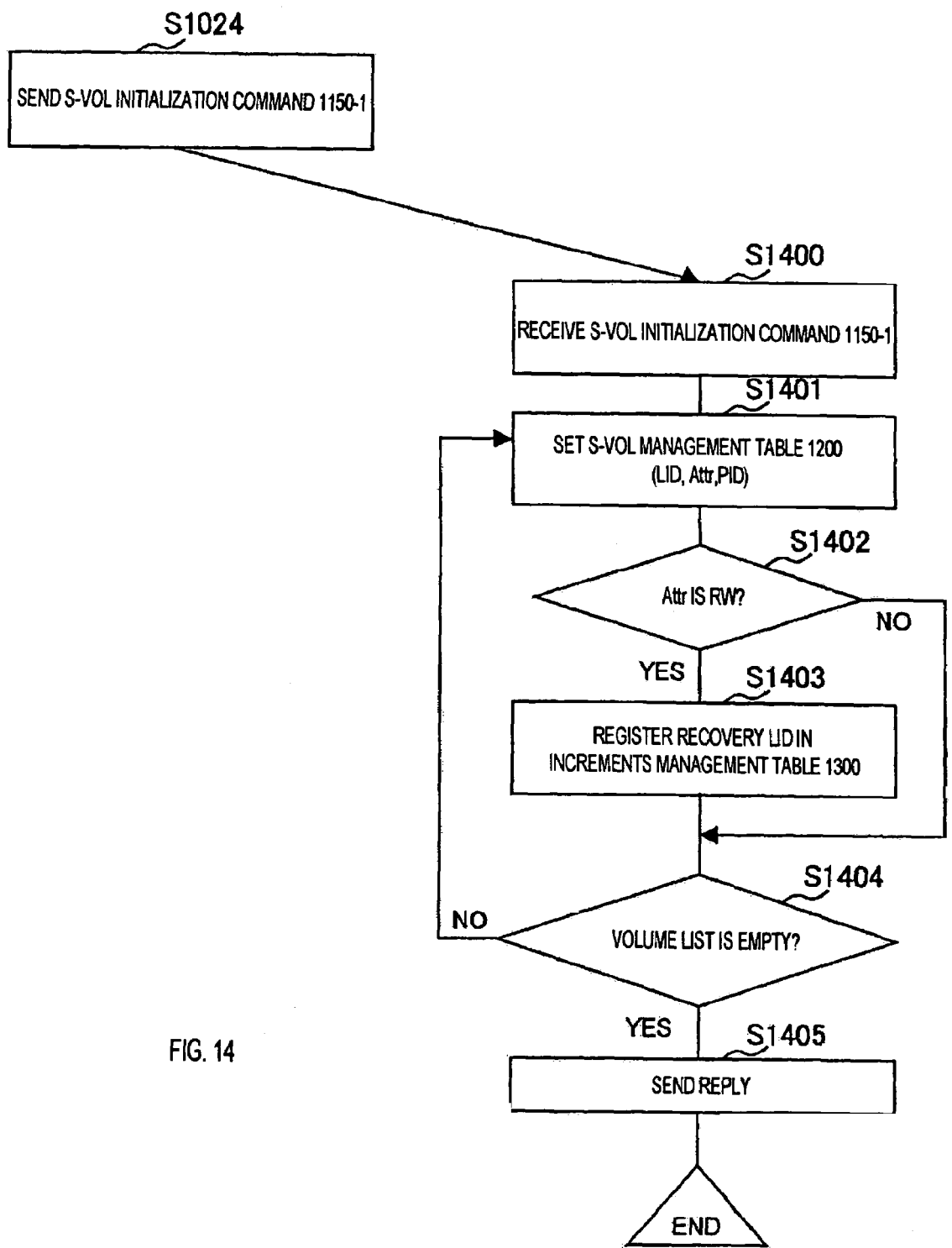
FIG. 14 is a flowchart illustrating an example of an S-VOL initialization process.

Next, a description will be given of a process related to initialization of an S-VOL, which is performed between the S-VOL group management unit 620 of the MA 620 and the S-VOL management unit 630 of the SA 230. FIGS. 12 and 13 show an S-VOL management table 1200 managed by the SA 230 and an increments management table 1300 managed by the SA 230, respectively. FIG. 14 shows a flowchart illustrating the S-VOL initialization process.

In FIG. 14, first, the S-VOL group management unit 620 sends the S-VOL initialization command 1150-1 to the S-VOL management unit 630 (S1024). The S-VOL management unit 630 receives the S-VOL initialization command 1150-1 (S1400).

The S-VOL management unit 630 then sets the logical volume IDs, the logical volume attributes, the physical volume IDS, and the recovery logical volume IDS in the S-VOL management table 1200 based on the volume lists 1172 included in the S-VOL initialization command 1150-1 (S1401). The S-VOL management table 1200 is created for each S-VOL group.

As shown in FIG. 12, the S-VOL management table 1200 manages frequencies of accesses 1205 to respective logical volumes in addition to the logical volume IDs 1201, the logical volume attributes 1202, the physical volume IDs 1203, and the recovery logical volume IDs 1204. Note that the access frequencies are measured by the SA 230.

An S-VOL read/write process unit 640 of the SA 230 adds "1" to a cell in the access frequency column 1205 of the S-VOL management table 1200 each time processing the read/write access to an S-VOL or spare S-VOL. The S-VOL group management unit 620 of the MA 220 sends the S-VOL operation command 1150 (command ID=2) where the LID of an S-VOL targeted for query is set to the S-VOL management unit 630 of the SA 230 to be able to acquire the access frequency of the S-VOL of interest. The S-VOL group management unit 620 selects an S-VOL to be used for recovery based on the acquired access frequencies.

The S-VOL management unit 630 judges whether the attribute of the S-VOL to be restored is "RW" (S1402). When the attribute of the S-VOL of interest is "RW", the recovery volume ID is registered in the increments management table 1300 (S1403). The increments management table 1300 manages block IDs of updated blocks for each registered increments-volume. The S-VOL management unit 630 then judges whether any volume list 1172 remains unprocessed (S1404). If any volume list 1172 remains unprocessed, the S-VOL management unit 630 proceeds to S1401, and if not, the S-VOL management unit 630 returns a reply to the S-VOL group management unit 620 (S1405).

Read Process

Figure 15:
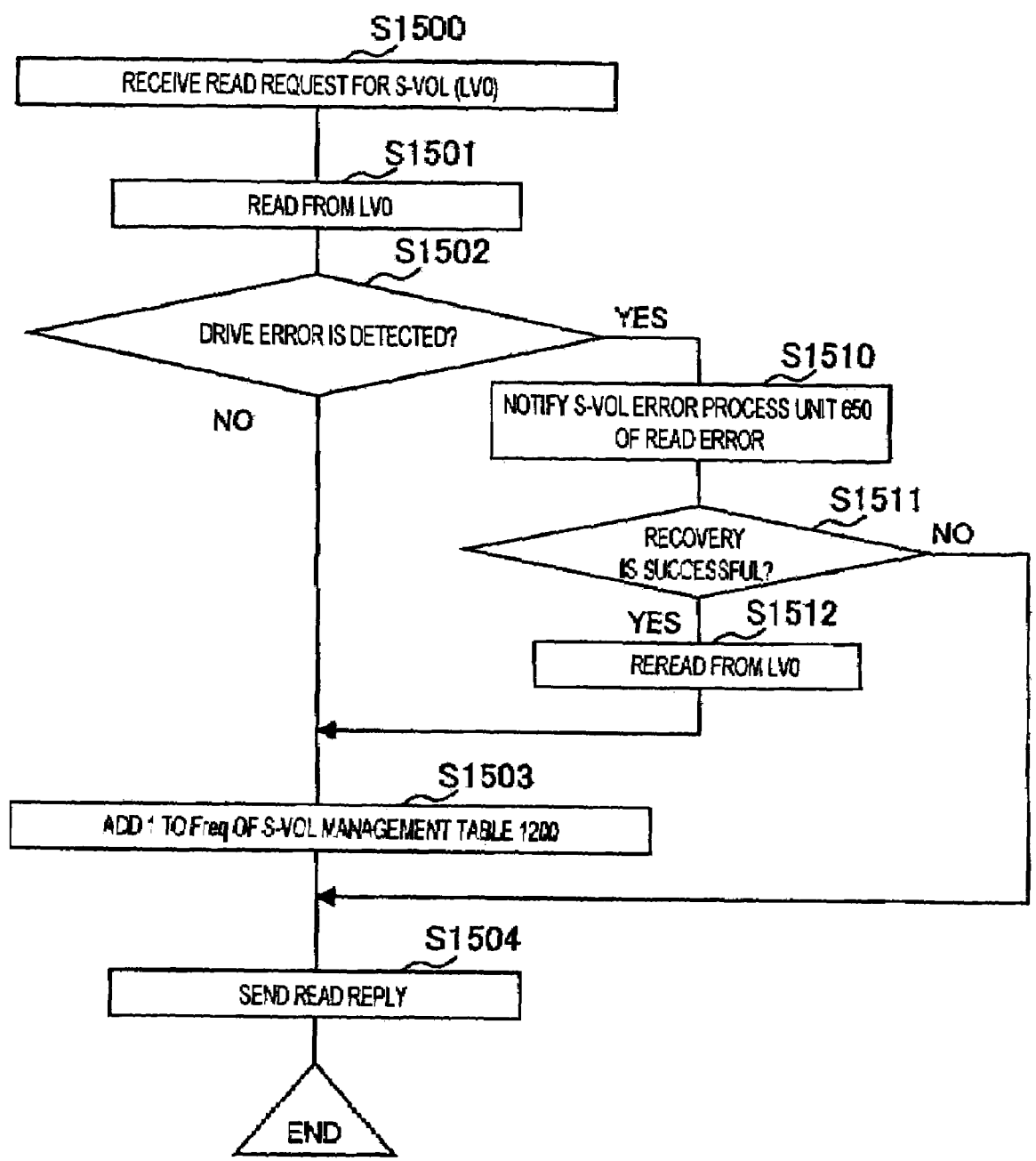
FIG. 15 is a flowchart illustrating an example of a read process.

FIG. 15 shows a flowchart illustrating a read process among processes performed by the S-VOL read/write process unit 640.

First, the S-VOL read/write process unit 640 receives a read request for an S-VOL which is sent from the HA 210 (S1500). The S-VOL read/write process unit 640 then reads data from the S-VOL (for example, S-VOL with LID=LV0) set in the above read request (S1501). The SA 230 is monitoring in real time whether an error happens in the disk drives 240. In S1502, if no drive error is detected (S1502: NO), the SA 230 adds 1 to the access frequency of the S-VOL with no drive error detected in the S-VOL management table 1200 (S1503). In S1504, the S-VOL read/write process unit 640 returns a replay for the read request to the HA 210.

Upon detecting the read error in S1502, the S-VOL read/write process unit 640 notifies an S-VOL error process unit 650 that the read error is detected (1510). Upon receiving the notification, the S-VOL error process unit 650 executes a read error process shown in a flowchart of FIG. 16. This process will be described later.

Subsequently, the S-VOL read/write process unit 640 receives a result of the read error recovery from the S-VOL error process unit 650 and judges whether the recovery is successful (S1511). When the recovery is successful, the S-VOL read/write process unit 640 re-executes the read access to the S-VOL where the read error has happened (S1512), adds 1 to the access frequency of the S-VOL in the S-VOL management table 1200 (S1503), and returns a reply for the read request to the HA 210 (S1504).

When the recovery is unsuccessful as a result of the judgment in S1511, the S-VOL read/write process unit 640 returns a read failure as a reply for the read request to the HA 210 (S1504).

Read Error Process

Figure 16:
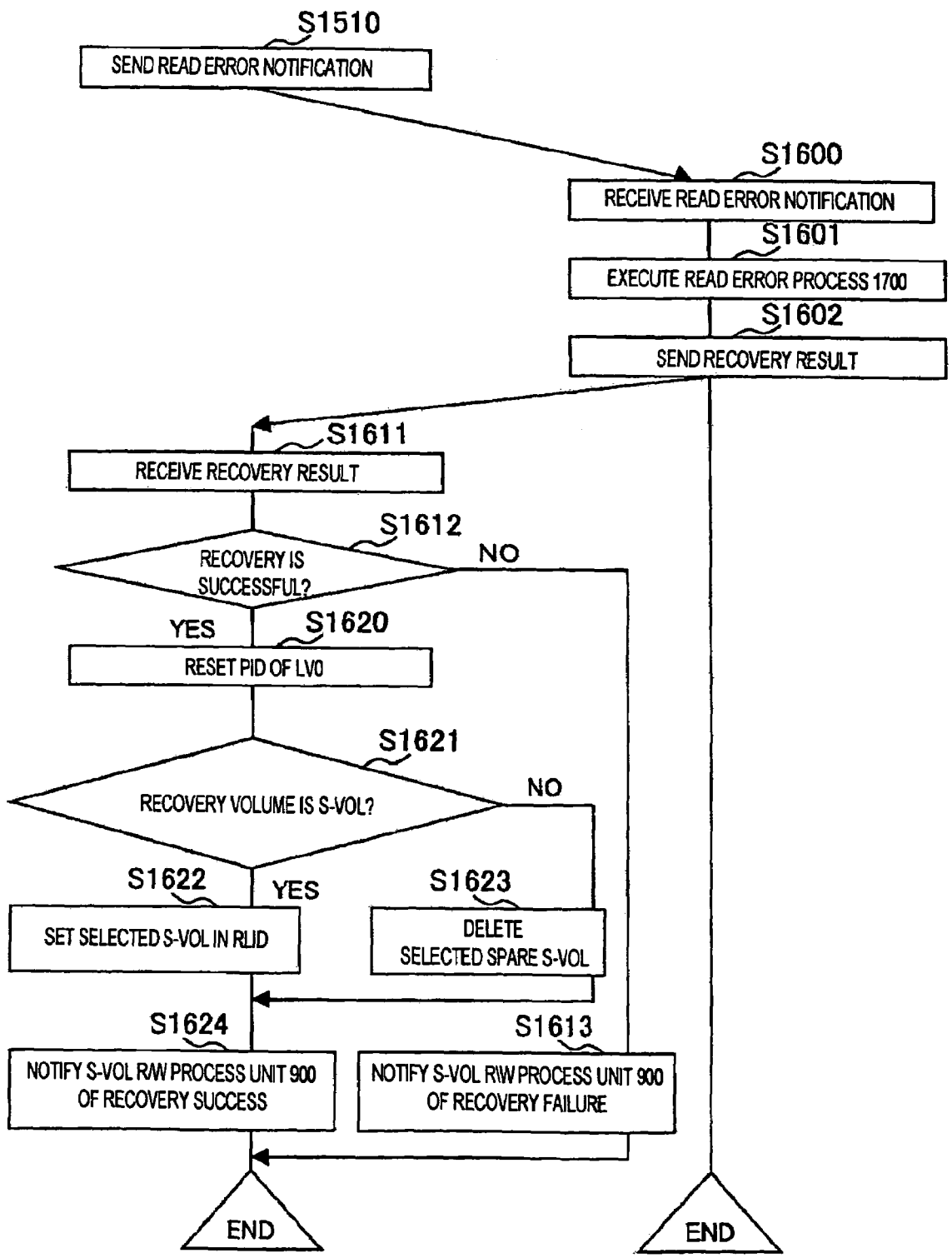
FIG. 16 is a flowchart illustrating an example of a read error process.

FIG. 16 shows a flowchart illustrating the process (read error process) related to read errors, which is performed between the S-VOL group management unit 620 and the S-VOL error process unit 650.

Upon receiving the read error notification sent from the S-VOL read/write process unit 640 (S1510), the S-VOL error process unit 650 sends the LID of the S-VOL where the read error has happened to the S-VOL group management unit 620 (S1610). Upon receiving the read error notification from the S-VOL error process unit 650 (S1600), the S-VOL group management unit 620 executes a read error process S1700 (S1601), and then sends a recovery result of execution of the read error process S1700 to the S-VOL error process unit 650 (S1602).

Upon receiving the recovery result (S1611), the S-VOL error process unit 650 judges whether the recovery is successful (S1612). When the recovery is unsuccessful as a result of the judgment, the S-VOL error process unit 650 notifies the S-VOL read/write process unit 640 that the recovery is unsuccessful (S1613). On the contrary, when the recovery is successful in the judgment of S1612, the S-VOL error process unit 650 replaces a physical volume constituting the S-VOL where the error has happened based on the recovery result received from the S-VOL group management unit 620 (S1620). Furthermore, the S-VOL error process unit 650 judges whether the physical volume is a physical volume of another S-VOL (S1621). When the physical volume of interest is a physical volume of another S-VOL, the LID of this S-VOL is set as the recovery LID of the S-VOL where the error has happened (S1622). When the physical volume of interest is a physical region of a spare S-VOL, the spare S-VOL is deleted from the S-VOL management table 1200 (S1623). The S-VOL error process unit 650 notifies the S-VOL read/write process unit 640 that the recovery is successful (S1624).

In such a manner, when the type of error is a drive error, the disk control system 200 of this embodiment replaces a physical volume constituting the S-VOL where the error has happened and forms the S-VOL with another physical volume normally operating. Therefore, the S-VOL can be recovered from the hardware error without changing the S-VOL LUN.

Figure 17:
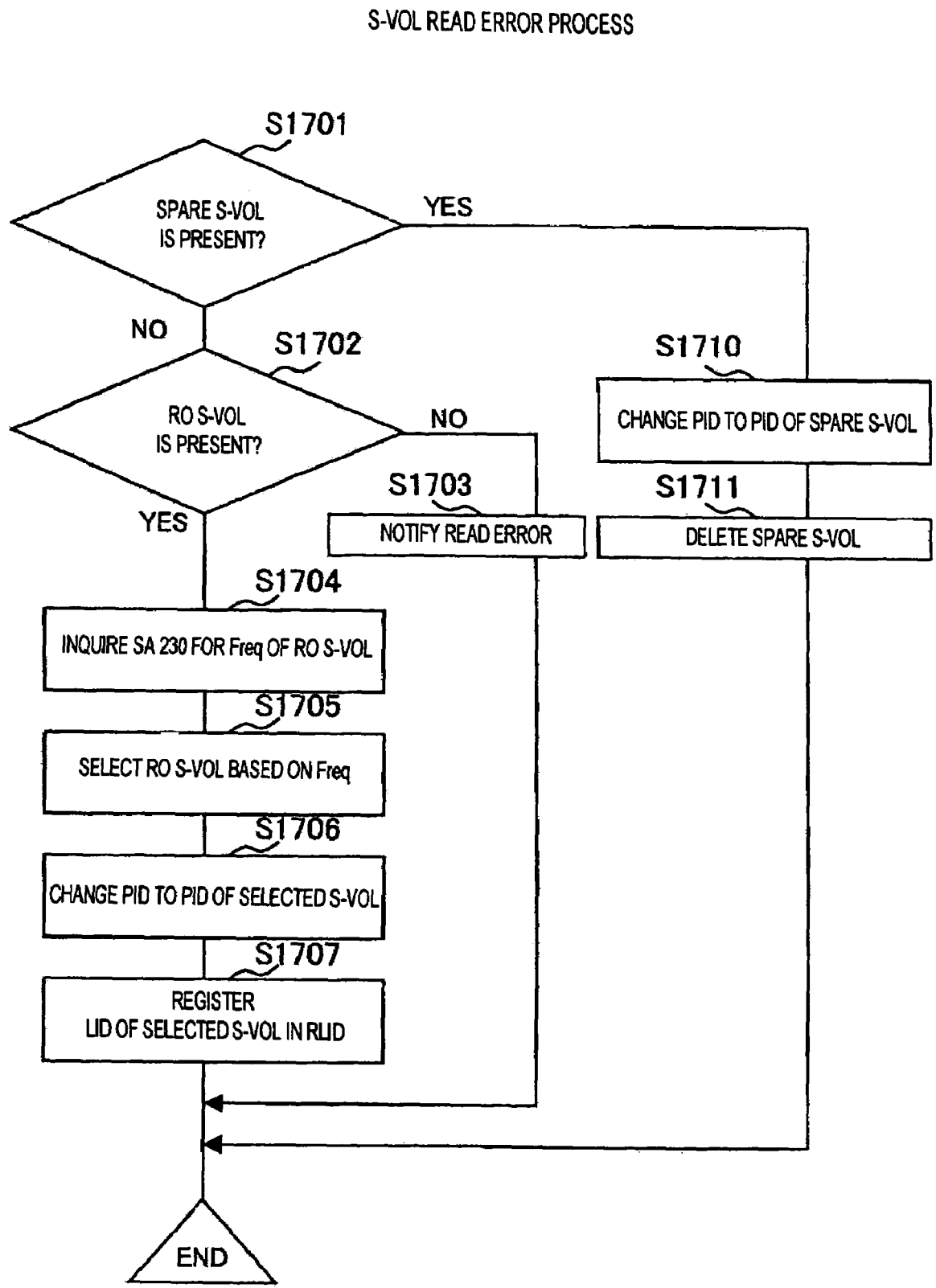
FIG. 17 is a flowchart illustrating an example of an S-VOL read error process.

FIG. 17 shows a flowchart illustrating the S-VOL read error process S1700 executed in S1601 of FIG. 16.

First, the S-VOL group management unit 620 judges the presence of a spare S-VOL (S1701). When the spare S-VOL is present, the S-VOL group management unit 620 changes the physical volume ID (PID) of the S-VOL where the error has happened to the physical volume ID of the spare S-VOL (S1710), and deletes the spare S-VOL ID from the S-VOL management table 1200 (S1711). On the contrary, when a spare S-VOL is not present in S1701, the S-VOL group management unit 620 judges the presence of an S-VOL with an attribute of "RO" (S1702). Herein, when no S-VOL with an attribute of "RO" is present in S1701, the S-VOL group management unit 620 returns a read error notification (S1703). On the contrary, when the S-VOLs with an attribute of "RO" are present, the S-VOL group management unit 620 queries the S-VOL error process unit 650 for the access frequencies of the S-VOLs with an attribute of "RO" (S1704). The S-VOL group management unit 620 selects an S-VOL with the lowest access frequency (Freq) in the S-VOL management table 1200 (S1705), and changes the physical volume ID of the S-VOL where the error has happened to the physical volume ID of the selected S-VOL (S1706). Furthermore, the S-VOL group management unit 620 registers the ID of the logical volume selected as a logical volume for recovery of the S-VOL where the error has happened in the S-VOL management table 1200 (S1707).

Write Process

Figure 18:
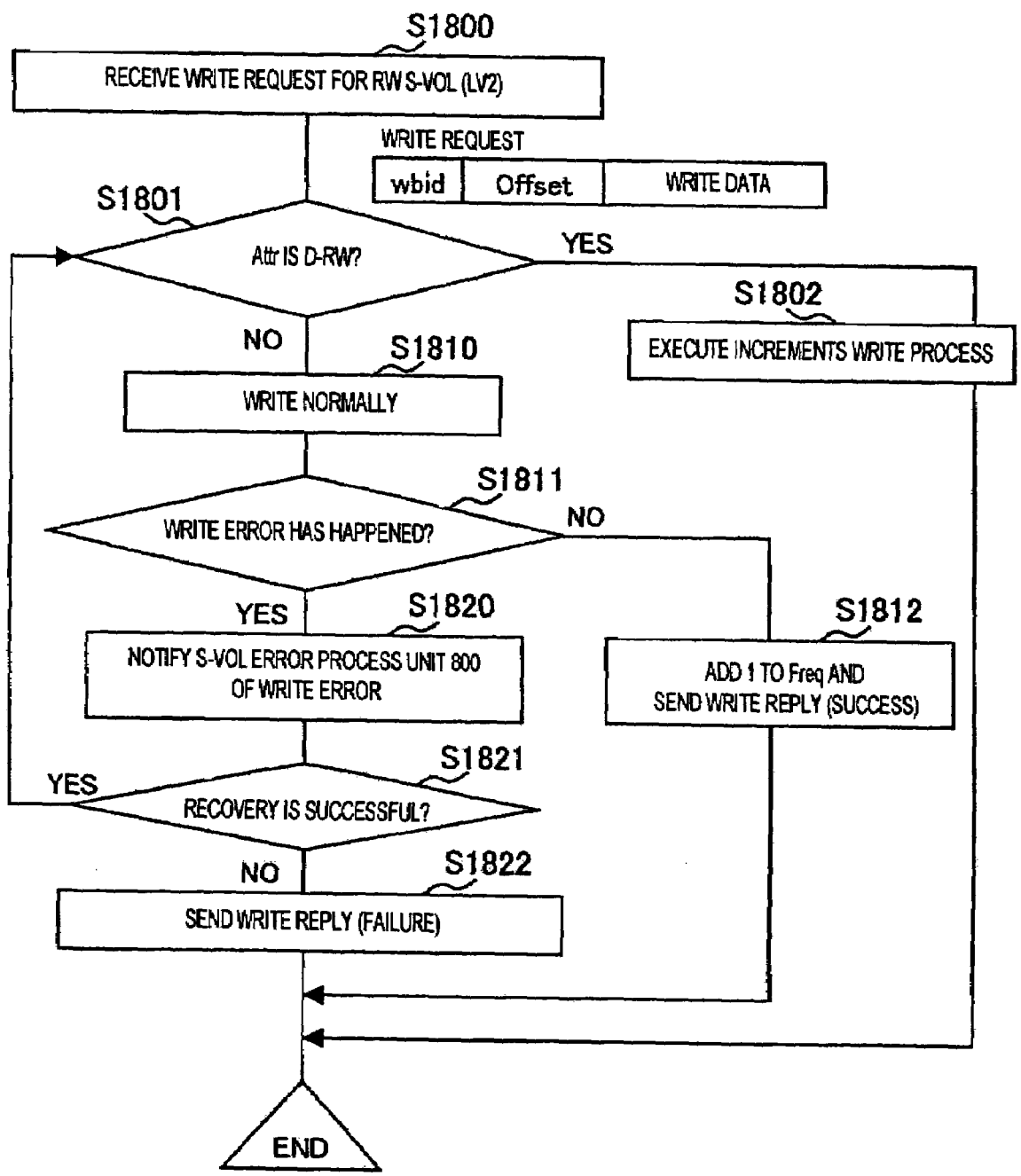
FIG. 18 is a flowchart illustrating an example of a write process.

FIG. 18 shows a flowchart illustrating a write process executed by the S-VOL read/write process unit 640. Upon receiving a write request for an S-VOL from the HA 210 (S1800), the S-VOL read/write process unit 640 of the SA 230 judges whether the attribute of the S-VOL set in the write request is "D-RW (increments write)" (S1801). When the attribute is "D-RW" as a result of the judgment, the S-VOL read/write process unit 640 executes an increments write process S1900 shown in FIG. 19 (S1802). The increments write process S1900 will be described later.

On the contrary, when the attribute is not "D-RW" as a result of the judgment, namely, when the attribute is "RW", the S-VOL read/write process unit 640 executes normal writing (S1810). The S-VOL read/write process unit 640 judges whether a write error has happened on the execution of normal writing (S1811). When the write error has not happened as a result of the judgment, the S-VOL read/write process unit 640 adds 1 to the access frequency (Freq) in the S-VOL management table 1200 and returns a reply (reply indicating the success of writing) for the write request to the HA 210 (S1812). On the contrary, when the write error has happened in the judgment of S1811, the S-VOL read/write process unit 640 notifies the S-VOL error process unit 650 that the write error has happened (S1820). Upon receiving a result of the write error recovery from the S-VOL error process unit 650, the S-VOL read/write process unit 640 then judges whether the recovery is successful (S1821). When the recovery is successful, the process proceeds to (S1801). When the recovery is unsuccessful, the S-VOL error process unit 650 returns a reply (reply indicating the write failure) for the write request to the HA 210 (S1822).

Figure 19:
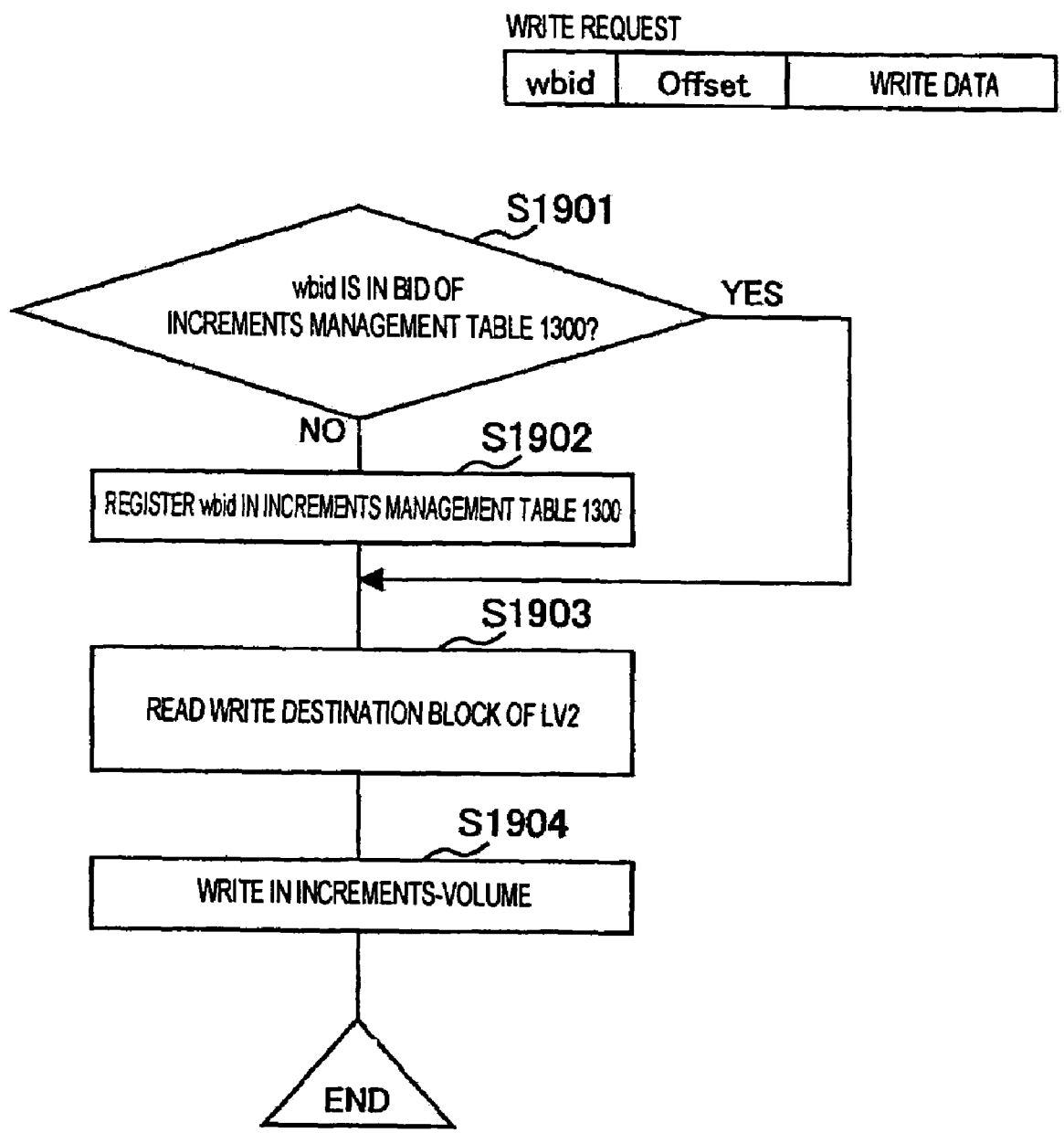
FIG. 19 is a flowchart illustrating an example of an increments write process.

FIG. 19 shows a flowchart illustrating the increments write process. In the increments write process, first, the S-VOL read/write process unit 640 judges whether a block ID is registered in a write destination block ID field 1352 for the logical volume ID (LID) of the S-VOL to which data is to be written in the increments management table 1300, namely, judges whether the S-VOL has been updated (S1901). Herein, when no block ID is registered in the field 1352 of the write destination block ID, the S-VOL read/write process unit 640 registers the write destination block ID field 1352 in the increments management table 1300 (S1902). The S-VOL read/write process unit 640 then reads data written in a block corresponding to the write destination block ID from the S-VOL (S1903), updates the read data with the data to be written, and writes the updated data in the increments-volume (S1904).

Figure 20:
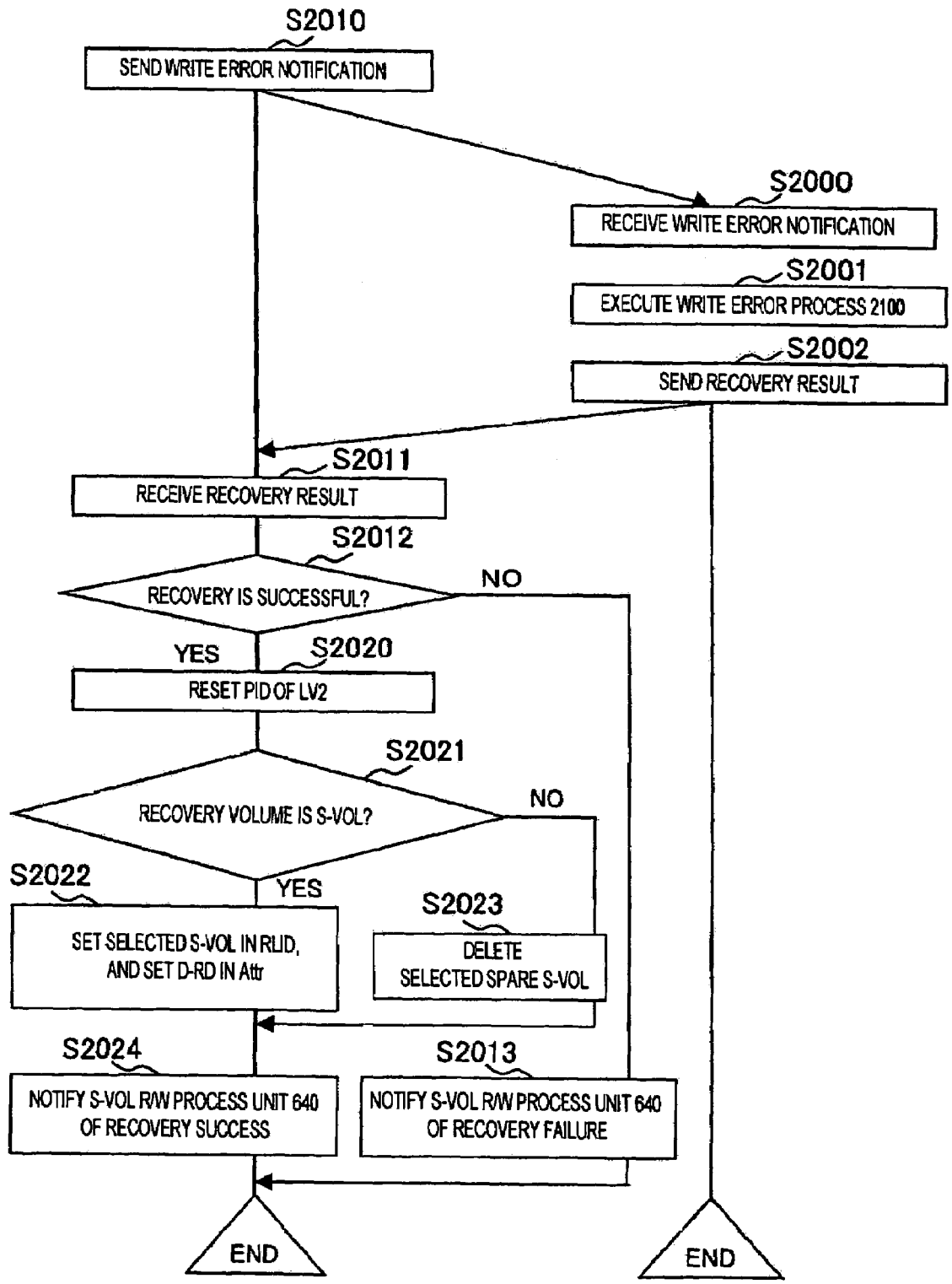
FIG. 20 is a flowchart illustrating an example of a write error process.

FIG. 20 shows a flowchart illustrating a write error process performed between the S-VOL group management unit 620 and the S-VOL error process unit 650. Upon receiving the write error notification sent from the S-VOL read/write process unit 640, the S-VOL error process unit 650 sends a notification that the write error has happened to the S-VOL group management unit 620 (S2010).

Figure 21:
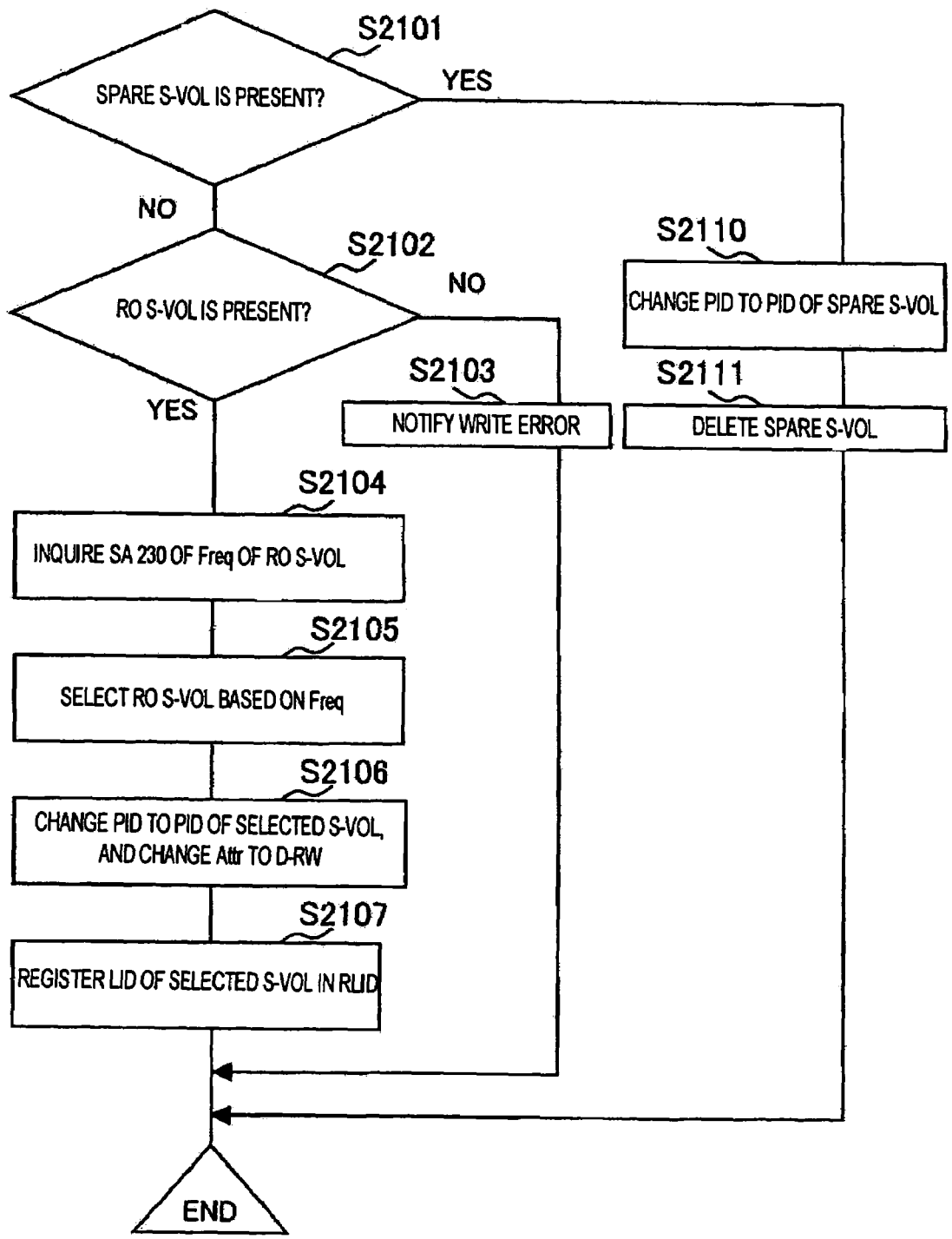
FIG. 21 is a flowchart illustrating an example of an S-VOL write error process.

Upon receiving the write error notification from the S-VOL error process unit 650 (S2000), the S-VOL group management unit 620 executes a write error process S2100 shown in FIG. 21 (S2001). The write error process S2100 will be described later. Subsequently, the S-VOL group management unit 620 sends a recovery result which is a result of execution of the write error process S2100 to the S-VOL error process unit 650 (S2002).

The S-VOL error process unit 650 receives the result of the write error recovery from the S-VOL group management unit 620 (S2011). The S-VOL error process unit 650 judges whether the recovery is successful based on the received recovery result (S2012). Herein, when the recovery is judged to be unsuccessful, the S-VOL error process unit 650 notifies the S-VOL read/write process unit 640 of the failure of recovery (S2013).

On the contrary, when the recovery is judged to be successful, the S-VOL error process unit 650 replaces the physical volume of the S-VOL where the error has happened based on the recovery result received from the S-VOL group management unit 620 (S2020). Furthermore, the S-VOL error process unit 650 judges whether the physical volume of interest is a physical volume of another S-VOL (S2021). When the physical volume of interest is a physical volume of another S-VOL in the judgment, the S-VOL error process unit 650 changes the attribute thereof to "D-RW" and sets the LID of the S-VOL as the ID (RID) of the S-VOL for recovery of the S-VOL where the error has happened in the S-VOL group management table 900 (S2022). When the physical volume of interest is the physical volume constituting a spare S-VOL in the judgment, the spare S-VOL is deleted from the S-VOL management table 1200 (S2023). The S-VOL error process unit 650 notifies the S-VOL read/write process unit 640 that the recovery is successful (S2024).

FIG. 21 shows a flowchart illustrating the aforementioned S-VOL write error process S2100. First, the S-VOL group management unit 620 judges the presence of the spare S-VOL (S2101). When the spare S-VOL is present as a result of the judgment, the S-VOL group management unit 620 changes the physical ID (PID) of the S-VOL where the error has happened to the physical volume ID of the spare S-VOL (S2110) and deletes the ID of the spare S-VOL from the S-VOL management table 1200 (S2111). On the contrary, when no spare S-VOL is present as a result of the judgment (S2101), the S-VOL group management unit 620 judges whether an S-VOL with an attribute of "RO" is present (S2102). When no S-VOL with an attribute of "RO" is present, the write error notification is returned (S2103). On the contrary, when S-VOLs with an attribute of "RO" are present, the S-VOL group management unit 620 queries the S-VOL error process unit 650 for the access frequencies of the S-VOLs with an attribute of "RO" (S2104). The S-VOL group management unit 620 selects an S-VOL with the lowest access frequency in the S-VOL management table 1200 (S2105) and changes the attribute of the S-VOL where the error has happened to "D-RW" and the physical volume ID (PID) to the physical volume ID (PID) constituting the selected S-VOL (S2106), respectively. In such a manner, using the S-VOL with the lowest access frequency can suppress the influence of the process related to the recovery on the transaction processing performed using the other S-VOLs, thus ensuring availability of S-VOLS.

Furthermore, the S-VOL group management unit 620 registers the logical volume ID in the RLID field 1204 of the S-VOL management table 1200 (S2107), the logical volume ID being selected in the S-VOL management table 1200 as the recovery LID for the S-VOL where the error has happened.

Restore

Figure 22:
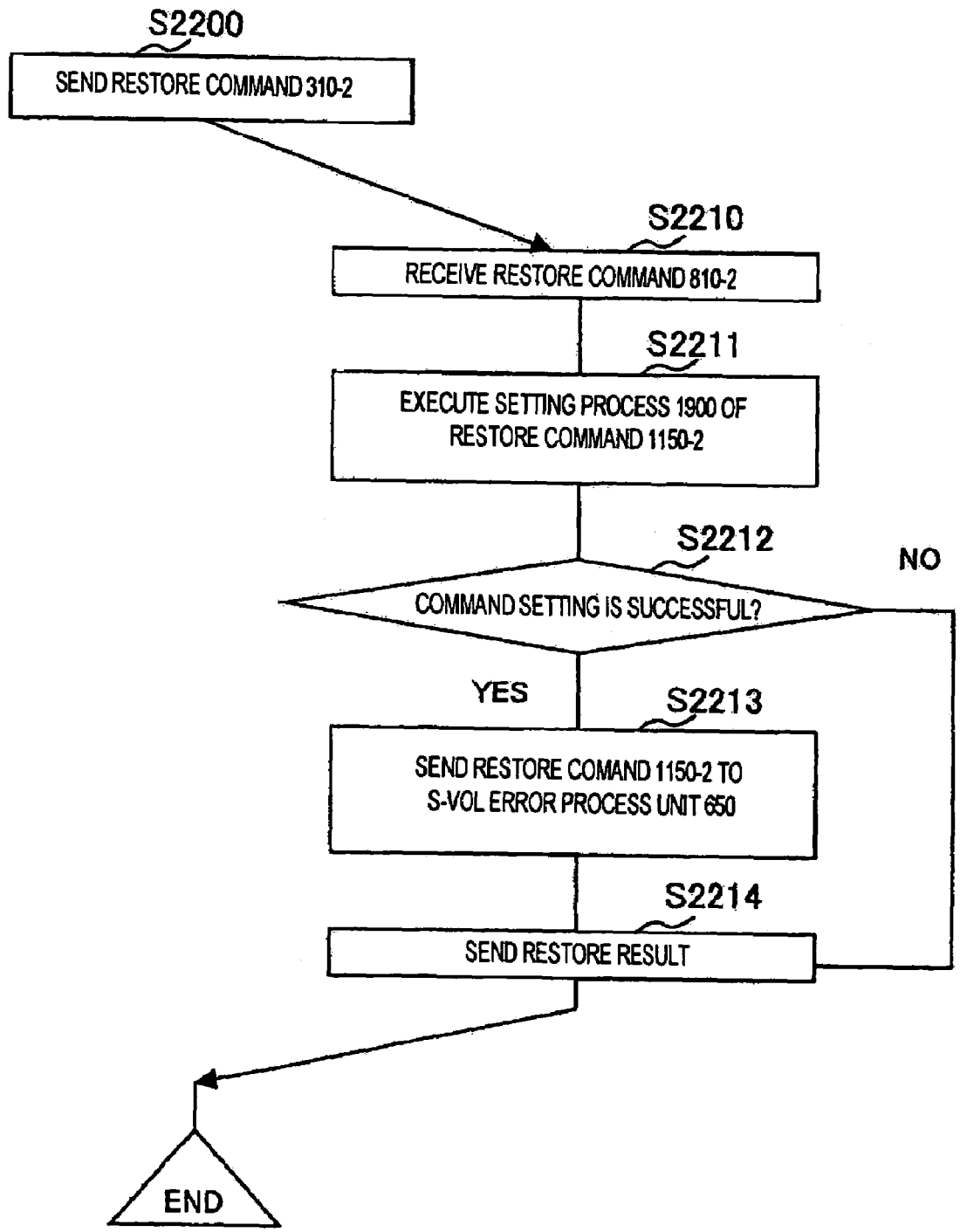
FIG. 22 is a flowchart illustrating an example of a restore process.

Next, a description will be given of a process related to restoring of an S-VOL where an error has happened, which is performed between the S-VOL group setting unit 610 and the S-VOL group management unit 620. FIG. 22 shows a flowchart illustrating the process related to restoring which is performed between the S-VOL group setting unit 610 and the S-VOL group management unit 620.

First, the S-VOL restore command 850-2 shown in FIG. 8C where the LID of an S-VOL desired to be restored, block IDs desired to be restored, and the like are set is sent from the S-VOL group setting unit 610 of the management server 110 to the S-VOL group management unit 620 (S2200).

Upon receiving the restore command 810-2 (S2210), the S-VOL group management unit 620 of the MA 220 executes an S-VOL restore command setting process S2300 (S2211). The S-VOL restore command setting process will be described in detail later. Subsequently, the S-VOL group management unit 620 judges whether setting of the S-VOL restore command 1150-2 is successful (S2212). When the setting is judged to be successful, the S-VOL group management unit 620 sends the restore command 1150-2 to the S-VOL group error process unit 650 (S2213). Moreover, the S-VOL group management unit 620 sends a restore result to the S-VOL group setting unit 610 of the management server 110 (S2214).

Figure 23:
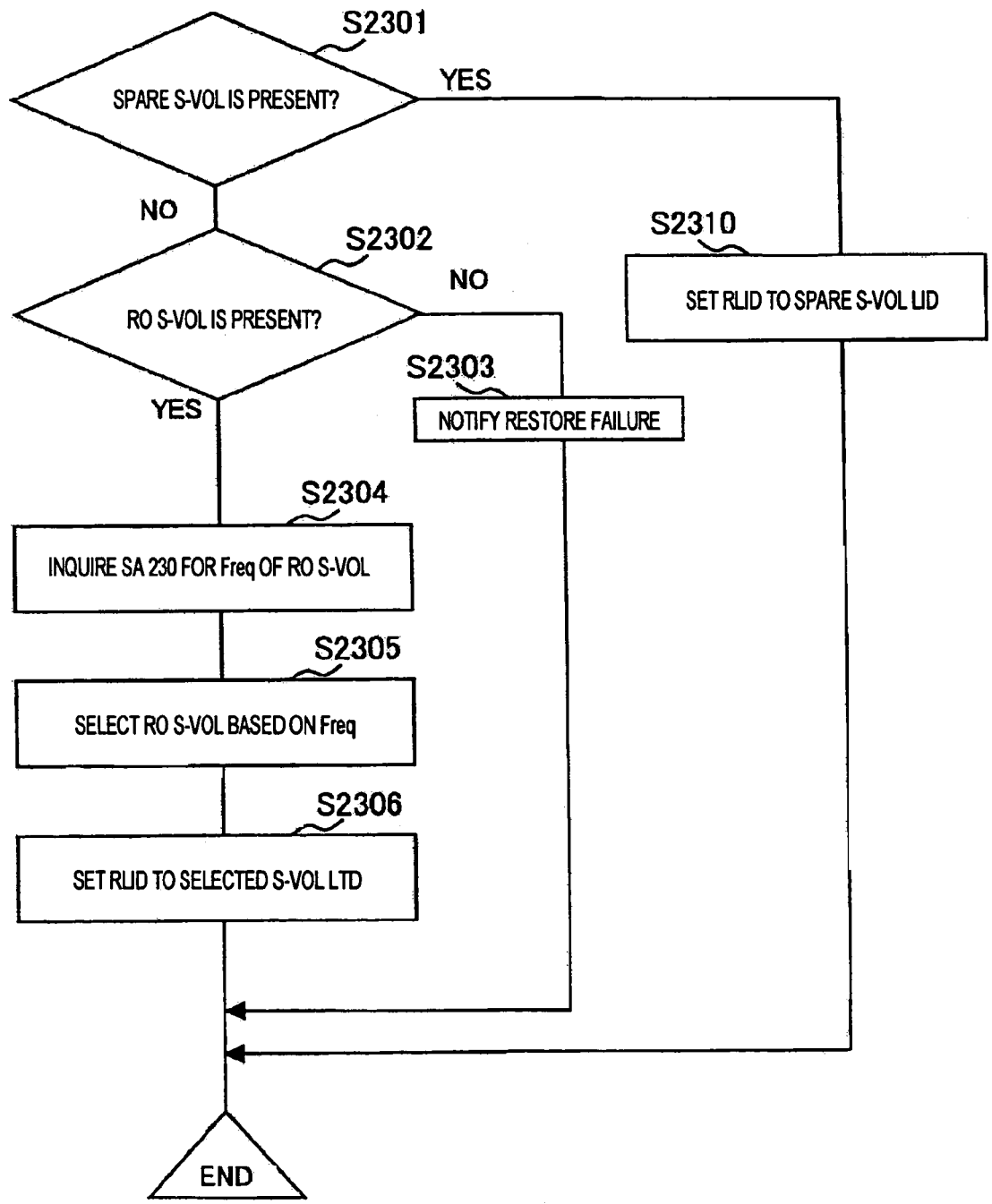
FIG. 23 is a flowchart illustrating an example of a restore command setting process.

FIG. 23 shows a flowchart illustrating the aforementioned restore command setting process S2300. This process is performed between the S-VOL group management unit 620 of the MA 220 and the S-VOL error process unit 650 of the SA 230.

First, the S-VOL group management unit 620 judges the presence of a spare S-VOL (S2301). When the spare S-VOL is present, the S-VOL management unit 620 sets the recovery LID set in the restore command 1150-2 in a corresponding cell of the LID column 902 in the S-VOL group management table 900 (S2310). On the contrary, when the spare S-VOL is not present, the S-VOL group management unit 620 judges whether an S-VOL with an attribute of "RO" is present (S2302). When no S-VOL with an attribute of "RO" is present, the S-VOL management unit 620 returns a notification that the restoring is unsuccessful (S2303). On the contrary, when S-VOLs with an attribute of "RO" are present, the S-VOL group management unit 620 queries the S-VOL error process unit 650 for the access frequencies of the S-VOLs with an attribute of "RO" (S2304). The S-VOL group management unit 620 selects an S-VOL with a lowest access frequency (Freq) in the S-VOL management table 1200 based on the access frequencies sent as a result of the query (S2305), and sets the recovery LID set in the restore command 1150-2 to the LID of the selected S-VOL (S2306). Using an S-VOL with the lowest access frequency in such a manner can suppress the influence of the process related to the recovery on the transaction processing performed using the other S-VOLs, thus ensuring high availability of S-VOLs.

Figure 24:
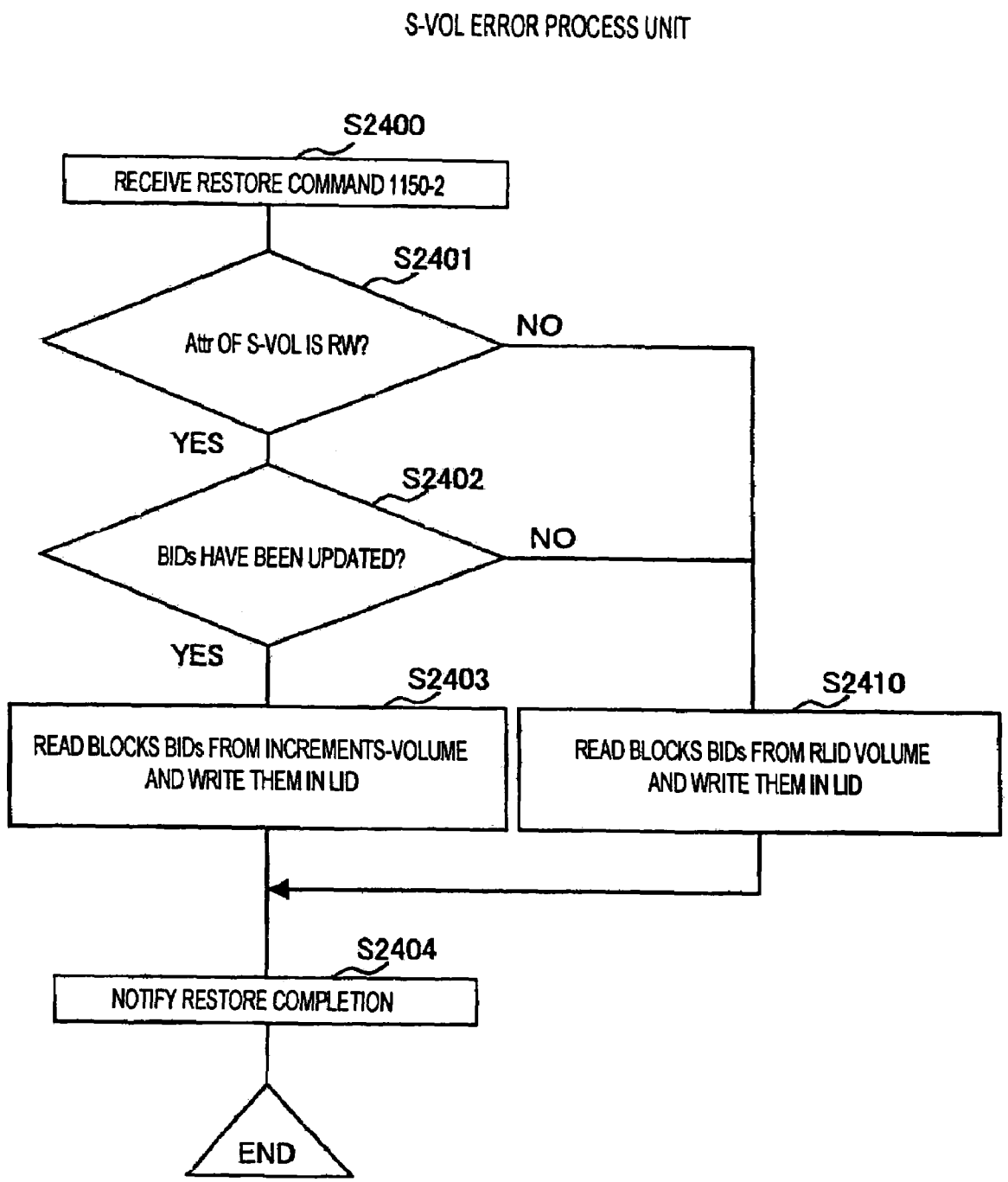
FIG. 24 is a flowchart illustrating an example of an S-VOL restore process.

FIG. 24 shows a flowchart illustrating an S-VOL restore process.

Upon receiving the restore command 1150-2 from the S-VOL group management unit 620 (S2400), the S-VOL error process unit 650 judges whether the attribute of the S-VOL to be restored, which is set in the restore command 1150-2, is "RW" (S2401). When the attribute is not "RW", the S-VOL error process unit 650 reads data of blocks set in the restore command 1150-2 from the recovery volume set in the restore command 1150-2 and writes the read data in the S-VOL desired to be restored (S2410). After the completion of this writing, the S-VOL error process unit 650 sends a notification that the restoring is completed (S2404). On the contrary, when the attribute is "RW" in the judgment of S2401, the S-VOL error process unit 650 judges whether the blocks which are desired to be restored and specified by the restore command 1150-2 have been updated with reference to the increments management table 1300 (S2402). When the blocks are not judged to have been updated as a result of the judgment, the process proceeds to S2410. On the contrary, when the blocks are judged to have been updated, the S-VOL error processing unit 650 reads data of the blocks desired to be restored from the increments-volume of the S-VOL desired to be restored and writes the read data in the S-VOL desired to be restored (S2403). After the completion of the writing, the S-VOL error process unit 650 sends the notification that the restoring is completed to the S-VOL group management unit 620 (S2404).

According to the present invention, the availability of S-VOLs can be ensured as described above with the embodiment. Moreover, each S-VOL is recovered using another S-VOL or the spare S-VOL. Accordingly, it is possible to recover the S-VOL including necessary contents at a certain point of time, for example, in data analysis, development, testing, and the like.

Moreover, the S-VOLs are not always recovered by a uniform method but recovered by a method according to the error type. Accordingly, the S-VOL can be efficiently recovered by a flexible method. In addition, by using the S-VOL with the lowest access frequency as a read-only volume used for the recovery, it is possible to suppress the influence of a process related to recovery on transaction processing performed using the other S-VOLs and thus ensure availability of S-VOLS. Moreover, a logical volume (spare S-VOL) to which read/write accesses are forbidden is used instead of the read only volume used in the above described recovery. Accordingly, it is possible to further suppress the influence of the process related to recovery on transaction processing performed using the other S-VOLs and thus ensure high availability of S-VOLs. Furthermore, in the case of drive errors, a storage device supplying a storage region constituting the S-VOL where an error has happened is replaced, and the S-VOL is formed with another storage device normally operating.

Recently, as for disk drives used for S-VOLs and the like, inexpensive drives such as ATA drives are sometimes employed to reduce a data management cost. However, if the frequency of errors is increased by using the inexpensive drives, the maintenance work is increased, and the management cost therefor is increased. To realize reduction in TCO (Total Cost of Ownership) using the inexpensive drives, reduction in management cost is essential. According to this embodiment, the S-VOLs can be efficiently recovered, and the reduction in TCO can be realized using the inexpensive drives.

Although the preferred embodiment of the present invention has been described in detail, it should be understood that various changes, substitutions and alterations can be made therein without departing from spirit and scope of the inventions as defined by the appended claims.

According to the present invention, the availability of S-VOLs can be ensured.

Moreover, since each S-VOL is recovered using another S-VOL or a spare S-VOL, it is possible to recover the S-VOL including necessary contents at a certain point of time, for example, in data analysis, development, testing, and the like.

By using a RO S-VOL with the lowest access frequency as the read-only S-VOL used for the aforementioned recovery, it is possible to suppress the influence of a process related to recovery on transaction processing performed using the other S-VOLs and thus ensure availability of S-VOLS. Furthermore, instead of the read-only volume used in the aforementioned recovery, a logical volume (spare S-VOL) is used which is controlled such that read/write accesses are forbidden is used and the contents of S-VOLs at a certain time are maintained. Accordingly, it is possible to further suppress the influence of the process related to recovery on transaction processing performed using the other S-VOLs and thus ensure high availability of S-VOLS.

What is claimed is:

1. A data I/O system comprising:
   a plurality of storage devices; and
   a controller which controls said storage devices, wherein said controller includes:
   a read/write unit, responsive to the subsequent receipt of a read request and a write request, for reading data stored in said storage devices and writing data in said storage devices;
   a logical volume management unit configured to map between a logical image of the data storage of a host processor (logical volume) and an actual space in said storage devices;
   a volume management unit configured to manage an active primary production volume (P-VOL) and a secondary mirror volume (S-VOL) group including multiple S-VOLS created as mirror images of said primary volume; and
   an S-VOL restoring unit configured to restore the data of a first S-VOL belonging to the S-VOL group with the data of a second S-VOL belonging to the S-VOL group depending on the type of an error that happens in the first S-VOL;
   wherein said controller further includes:
   an access management unit configured to render at least one of said S-VOLs belonging to an S-VOL group read-only as at least one Read-only (RO) S-VOL and rendering at least one of said S-VOLs belonging to an S-VOL group read-and-writable as at least one Read-and-Writable (RW) S-VOL; and
   an increments management unit configured to store updates that have occurred in a Read-and-Writable (RW) S-VOL since a P-VOL and the RW S-VOL were separated in an increments-volume,
   wherein said S-VOL restoring unit recovers a RW S-VOL belonging to the S-VOL group by replacing the RW S-VOL with the at least one Read-only (RO) S-VOL that has been updated by data of the increments-volume of the RW S-VOL as an error happens in the RW S-VOL.

2. A data I/O system according to claim 1, wherein said S-VOL restoring unit recovers an S-VOL belonging to the S-VOL group by copying data of the at least one Read-only (RO) S-VOL to said S-VOL as an error happens in said S-VOL.

3. A data I/O system according to claim 1, wherein said S-VOL restoring unit recovers an S-VOL belonging to the S-VOL group by replacing the S-VOL with said at least one Read-only (RO) S-VOL as an error happens in said S-VOL.

4. A data I/O system according to claim 1, wherein said controller further includes:
   a monitoring unit configured to monitor frequencies of accesses to said at least one Read-only (RO) S-VOL, wherein said S-VOL restoring unit restores the data of an S-VOL belonging to the S-VOL group by copying the data of said at least one RO S-VOL with the lowest access frequency as an error happens in said S-VOL.

5. A data I/O system according to claim 1, wherein said controller further includes:
   a monitoring unit configured to monitor frequencies of accesses to the at least one Read-only (RO) S-VOL, wherein said S-VOL restoring unit recovers an S-VOL belonging to the S-VOL group by replacing the S-VOL with said at least one RO S-VOL with the lowest access frequency as an error happens in said S-VOL.

6. A data I/O system according to claim 1, wherein said controller further includes:
   a monitoring unit configured to monitor frequencies accesses to the at least one Read-only (RO) S-VOL; and
   wherein said S-VOL restoring unit recovers a RW S-VOL belonging to the S-VOL group by replacing the RW S-VOL with the at least one RO S-VOL with the lowest access frequency that has updated by data of the increments-volume of the RW S-VOL as an error happens in the RW S-VOL.

7. A data I/O system according to claim 6,
   wherein said controller further includes a spare SVOL management unit configured to manage a spare S-VOL created as a mirror image of a S-VOL belonging to the S-VOL group and to which read/write accesses are forbidden,
   wherein said S-VOL restoring unit recovers the S-VOL where an error has happened by using said spare S-VOL instead of said RO S-VOL.

8. A data I/O system according to claim 6 further comprising a plurality of the storage devices,
   wherein said S-VOL restoring unit replaces a storage device where a hardware error has happened and forms an S-VOL with another hardware device.

9. A data I/O system according to claim 7 further comprising a plurality of the storage devices,
   wherein said S-VOL restoring unit replaces a storage device where a hardware error has happened and forms an S-VOL with another hardware device.

10. A data I/O system according to claim 1,
    wherein said storage devices are disk drives,
    wherein said controller further includes a communication adapter communicating with a data processing system issuing read and write requests.

11. A method of controlling a data I/O system which includes:
    a plurality of storage devices;
    a read/write unit, responsive to the subsequent receipt of a read request and a write request, for reading data stored in said storage devices and writing data in said storage devices; and
    a logical volume management unit configured to map between a logical image of the data storage of a host processor (logical volume) and an actual space in said storage devices;
    said method comprising:
    managing an active primary production volume (PVOL) and a secondary mirror volume (S-VOL) group including multiple S-VOLs created as mirror images of said primary volume;
    restoring the data of a first S-VOL belonging to the S-VOL group with the data of a second S-VOL belonging to the S-VOL group depending on the type of an error that happens in the first S-VOL;

rendering at least one of said S-VOLs belonging to an S-VOL group read-only as at least one Read-only (RO) S-VOL and rendering at least one of said S-VOLs belonging to an S-VOL group read-and-writable as at least one Read-and-Writable (RW) S-VOL;

storing updates that have occurred in a Read-and-Writable (RW) S-VOL since a P-VOL and the RW S-VOL were separated in an increments-volume; and recovering a RW S-VOL belonging to the S-VOL group by replacing the SW S-VOL with the at least one Read-only (RO) S-VOL that has been updated by data of the increments-volume of the RW S-VOL as an error happens in the RW S-VOL.

12. A method according to claim 11, further comprising:
recovering an S-VOL belonging to the S-VOL group by copying data of the at least one Read-only (RO) S-VOL to said S-VOL as an error happens in said S-VOL.

13. A method according to claim 11, further comprising:
recovering an S-VOL where a drive error has happened by replacing the S-VOL with said at least one RO S-VOL.

14. A method according to claim 11, further comprising:
monitoring frequencies of accesses to said at least one Read-only (RO) S-VOL, restoring the data of an S-VOL belonging to the S-VOL group by copying the data of said at least one RO S-VOL with the lowest access frequency as an error happens in said S-VOL.

15. A method according to claim 11, further comprising:
monitoring frequencies of accesses to the at least one Read-only (RO) S-VOL, recovering an S-VOL belonging to the S-VOL group by replacing the S-VOL with the at least one RO S-VOL with the lowest access frequency as an error happens in said S-VOL.

16. A method according to claim 11, further comprising:
monitoring frequencies accesses to the at least one Read-only (RO) S-VOL; and recovering a RW S-VOL belonging to the S-VOL group by replacing the RW S-VOL with the at least one RO S-VOL with the lowest access frequency that has updated by data of the increments-volume of the RW S-VOL as an error happens in the RW S-VOL.

17. A method according to claim 16, further comprising:
managing a spare S-VOL created as a mirror image of a S-VOL belonging to the S-VOL group and to which read/write accesses are forbidden, recovering the S-VOL where an error has happened by using said spare S-VOL instead of said at least one RO S-VOL.

18. A method according to claim 16, further comprising:
replacing a storage device where a hardware error has happened and forms an S-VOL with another hardware device.

* * * * *